United States Patent
Iura et al.

(10) Patent No.: US 7,521,889 B2
(45) Date of Patent: Apr. 21, 2009

(54) METHOD OF BRAKING INDUCTION MOTOR AND CONTROL APPARATUS

(75) Inventors: Hideaki Iura, Fukuoka (JP); Shigekazu Nakamura, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 350 days.

(21) Appl. No.: 10/589,881

(22) PCT Filed: Feb. 14, 2005

(86) PCT No.: PCT/JP2005/002119

§ 371 (c)(1),
(2), (4) Date: Aug. 18, 2006

(87) PCT Pub. No.: WO2005/081396

PCT Pub. Date: Sep. 1, 2005

(65) Prior Publication Data

US 2007/0182358 A1    Aug. 9, 2007

(30) Foreign Application Priority Data

Feb. 19, 2004    (JP)    ............................... 2004-043121

(51) Int. Cl.
*H02P 3/18*    (2006.01)
*H02P 23/00*   (2006.01)
*H02P 25/00*   (2006.01)
*H02P 27/00*   (2006.01)
*H02P 27/06*   (2006.01)

(52) U.S. Cl. ..................... 318/759; 318/811; 318/432; 318/434

(58) Field of Classification Search ................. 318/759, 318/811, 432, 434
See application file for complete search history.

(56) References Cited

U.S. PATENT DOCUMENTS 7,304,452 B2 * 12/2007 Nagai et al. ................. 318/811
7,402,975 B2 *  7/2008 Takata et al. ................ 318/727

FOREIGN PATENT DOCUMENTS

| JP | 6-165547 A | 6/1994 |
|----|------------|--------|
| JP | 10-341583 A | 12/1998 |
| JP | 2000-312497 A | 11/2000 |
| WO | WO 98/11663 A1 | 3/1998 |

* cited by examiner

*Primary Examiner*—Walter Benson
*Assistant Examiner*—Erick Glass
(74) *Attorney, Agent, or Firm*—Sughrue Mion, PLLC

(57) ABSTRACT

In a DC braking method for stopping an induction motor, torque shock generated by an abrupt change of an output current phase is reduced to a predetermined value or less when a switch-over from a normal control state to a DC braking state. When a switch-over from a normal control state to a DC control state is performed, the generated torque shock is reduced to a predetermined value or less is provided. In this case, an abrupt change of an output voltage phase is inhibited by predictably operating the output voltage phase during the DC braking to control the power converter on the basis of a setup DC braking initiation frequency or a phase advanced until the DC braking is initiated, which is predetermined by a deceleration rate and the setup DC braking initiation frequency and the output voltage phase of a normal control state at the instant that a switch-over to the DC braking state is performed.

16 Claims, 15 Drawing Sheets

METHOD OF BRAKING INDUCTION MOTOR AND CONTROL APPARATUS

TECHNICAL FIELD

The present invention relates to an induction motor control device for stopping an induction motor, and more particularly, to a braking method and apparatus for controlling torque shock, caused by an abrupt change of an output current phase when a switch-over from a normal driving state to a direct current (DC) braking state is performed, to be reduced to a predetermined value or less by predictably operating an output voltage phase for flowing out a direction current.

RELATED ART

On a conventional direct current (DC) braking function of an induction motor, a DC braking technique that is embedded in a high performance vector control device and not tripped (an abnormal stop of a control device) and a DC braking technique having a small vibration during the induction motor is stopped are disclosed (for example, refer to a patent document 1). When the control device is tripped, the control device is abnormally stopped, and simultaneously, an alarm is displayed on a display part.

FIG. 14 is a block diagram illustrating a detailed example of a vector control device having a velocity sensor. The reference numeral 101 denotes a DC braking control arithmetic unit, which operates as shown in the flow chart of FIG. 15. The reference numeral 102 denotes a velocity control arithmetic unit, in which a torque current (corresponding to a torque) instruction iq* is operated on the basis on a velocity instruction ω input from external systems of the vector control device and a velocity detection value ωr (hereinafter, the reference symbol * denotes an instruction value). The reference numeral 103 denotes a magnetic flux arithmetic unit, where iq* is input, a magnetic flux dividing current instruction id* and a sliding frequency ωs that satisfy a vector control condition are operated to output id*, iq*, and ws. The reference numeral 104 denotes a d-p axis ACR which operates voltage instructions vq* and vd* for allowing current detection values iq and id to follow iq* and id*. The reference numeral 105 denotes an inverse d-q converter, which converts vq* and vd* from a rotation coordinate d-q axis into a three phase voltage instruction. The reference numeral 106 denotes a PWM arithmetic unit, which operates a firing pattern for turning on/off a switching element on the basis of a three phase voltage instruction. The reference numeral 107 denotes a power conversion circuit. The reference numeral 108 denotes a slip compensation arithmetic unit, which receives the output from the magnetic flux arithmetic unit 103 to operate a primary frequency ω1 of the induction motor. The reference numeral 109 denotes an integrator, which integrates the primary frequency ω1 and computes a phase θ1 on a d-axis to output them to the d-q converter 111 or the inverse d-q converter 105. The reference numeral 110 denotes a velocity detection arithmetic unit, which operates the velocity based on the signal from the position detector such as an encoder or performs a velocity estimation based on a current or the like if the position detection does not exist. The reference numeral 111 denotes a d-q converter, which operates current detection values id and iq converted into rotation coordinates with respect to a phase θ1 of a d-axis. The reference numeral 112 denotes a position detector such as an encoder, and the reference numeral 113 denotes an induction motor, which includes switches S101, S103, and S104 controlled by the DC braking control arithmetic unit 101. The DC braking control arithmetic unit 101 receives a braking force target value of the DC braking and a DC braking instruction (not shown in the drawing) used to switch over to the DC braking drive. When the vector control is performed, the switches S101, S103, and S104 are switched over to the side of "a" by the DC braking control arithmetic unit 1, and the vector control is performed as described above.

Referring to FIG. 15, in a step 201, the phase of a voltage vector θv is calculated only at an instant that a switch-over from the vector control to the DC braking is performed. In the step 202, the switch S101 is switched over to the side of "b" to input θv into θdq. In the step 203, the switch S103 is switched over to the side of "b" to input the instruction id* of the ACR of the d-axis and the value corresponding to the braking force input to the DC braking control arithmetic unit 101 to the ACR 104 of the d-q axis, so that the instruction iq* of the ACR of the q-axis is set to 0. In a step 204, an absolute value of "iq" and a predetermined reference value "α" are compared. In the step 205a, if the absolute value "iq" is larger than the reference value "α", the switch S104 is switched over to the side of "a", so that the output of the ACR 104 of the d-q axis is delivered to the PWM arithmetic unit 106. In a step 205b, if the absolute value of "iq" is smaller than the reference value "α", the switch S104 is switched over to the side of "b", the output of the ACR of the d-axis is validated, the q-axis voltage instruction Vq* is set to zero (Vq*=0, i.e., the ACR of the q-axis is invalidated), and the voltage instruction is output to the PWM arithmetic unit 106. Through the steps 204 and 205, it is possible to prevent vibration generated when a rotor position determination of an alternating current (AC) motor is stopped.

As described above, in a conventional induction motor control apparatus and its control method, the phase of the vector θv is calculated only at an instant that a switch-over from the vector control to the DC braking is performed, "θv" is input to "θdq", the instruction iq* of the ACR of the q-axis is set to 0, and a control is performed by the ACR 104 of the d-q axis. Then, if the absolute value iq is smaller than the predetermined reference value α, the ACR of the q-axis is invalidated.

Patent Document 1: WO 98/11663, FIGS. 1 and 2

Problems to be Solved by the Invention

The conventional induction motor control device and its control method discloses a DC braking method in the control device of the induction motor, in which the current supplied from the power conversing device is divided by vector components to perform a control. In addition, as described in the patent document 1 that torque is not generated in a low velocity range in the case of a V/f control, the DC braking is initiated when the frequency is equal to or lower than the setup DC braking initiation frequency in the V/f control. However, when the method disclosed in the patent document 1 is executed, it is impossible to set a variation of the current phase to be equal to or lower than a predetermined value because the setup DC braking initiation frequency is different from the rotation information of the induction motor. In addition, in both of the vector controls that a velocity sensor is installed and the velocity sensor is not installed, if the rotation number is equal to or lower than a predetermined value at the state that the phase of the current instruction is fixed, it is necessary to fix the voltage phase, and other complicated processes are also generated. Furthermore, when the ACR 104 of the d-q axis is used to perform the control during the DC braking, the voltage phase is changed because the voltage instruction Vd* of the d-axis and the voltage instruction Vq* of the q-axis vary, so that a DC voltage and a DC current cannot be output.

The present invention is contrived solve the aforementioned problems, and is to provide a control apparatus and a braking method, by which an abrupt change of the current phase is inhibited and the torque shock can be reduced to a predetermined value or less when a switch-over from the normal control state to a DC braking state is performed by predictably operating the output voltage phase during the DC braking on the basis of the output voltage phase in a normal control state.

Means for Solving the Problems

In order to solve the aforementioned problems, the present invention provides the following methods and apparatuses.

An aspect of the present invention is a direct current (DC) braking method for stopping an induction motor using a control device including: a power converter for driving the induction motor, a PWM arithmetic unit for determining a switching pattern of the power converter on the basis of a primary voltage instruction and an output phase obtained by adding a voltage phase and a magnetic flux phase, a voltage arithmetic unit, a torque current controller and an excitation current controller, wherein torque shock generated by an abrupt change of an output current phase is reduced to a predetermined value or less by predictably operating an output voltage phase during the DC braking on the basis of an output voltage phase of a normal control state, when a switch-over from the normal control state to a DC braking state is performed. More specifically, the output voltage phase during the DC braking is predictably operated on the basis of an output voltage phase of the normal control state and a phase advanced until the DC braking is initiated.

In another specific enhancement, the phase advanced until the DC braking is initiated is operated on the basis of a setup DC braking initiation frequency.

In another specific enhancement, the phase advanced until the DC braking is initiated is operated on the basis of a deceleration rate and a setup DC braking initiation frequency.

In another specific enhancement, the torque shock during a restart is reduced to a predetermined value or less by controlling the output voltage phase during the DC braking with respect to a coordinate axis for a normal control.

Another aspect of the present invention is a control device capable of a DC braking for stopping an induction motor, the control device including: a power converter for driving the induction motor; a PWM arithmetic unit for determining a switching pattern of the power converter on the basis of a primary voltage instruction and an output phase obtained by adding a voltage phase and a magnetic flux phase; a voltage arithmetic unit; a torque current controller; and an excitation voltage controller, wherein torque shock generated by an abrupt change of an output current phase is reduced to a predetermined value or less by predictably operating an output voltage phase during the DC braking on the basis of an output voltage phase of a normal control state, when a switch-over from the normal control state to a DC braking state is performed.

More specifically, the output voltage phase during the DC braking is predictably operated on the basis of an output voltage phase of the normal control state and a phase advanced until the DC braking is initiated.

In another specific enhancement, the phase advanced until the DC braking is initiated is operated on the basis of a setup DC braking initiation frequency.

In another specific enhancement, the phase advanced until the DC braking is initiated is operated on the basis of a deceleration rate and a setup DC braking initiation frequency.

In another specific enhancement, the torque shock during a restart is reduced to a predetermined value or less by controlling the output voltage phase during the DC braking with respect to a coordinate axis for a normal control.

ADVANTAGE OF THE INVENTION

According to an aspect of the present invention, in a DC braking method for stopping the induction motor, torque shock generated by an abrupt change of an output current phase can be reduced to a predetermined value or less by predictably operating an output voltage phase during a DC braking on the basis of an output voltage phase of a normal control state when a switch-over from the normal control state to a DC braking state is performed.

More specifically, since the output voltage phase during the DC braking can be operated on the basis of the output voltage phase of the normal control state the phase advanced until the DC braking is initiated, it is possible to reduce the torque shock generated by an abrupt change of the output current phase to a predetermined value or less.

More specifically, since the phase advanced until the DC braking is initiated can be calculated on the basis of a setup DC braking initiation frequency, it is possible to reduce the torque shock generated by an abrupt change of the output current phase to a predetermined value or less.

More specifically, since the phase advanced until the DC braking is initiated can be operated on the basis of the deceleration rate and the setup DC braking initiation frequency, it is possible to reduce the torque shock generated by an abrupt change of the output current phase to a predetermined value or less.

More specifically, it is possible to reduce a torque shock generated during a restart to a predetermined value or less by controlling the output voltage phase during the DC braking, predicted by the method of predictably operating the output voltage phase during the DC braking, with respect to the coordinate axis of the normal control.

According to another aspect of the invention, in an apparatus for controlling the induction motor, the torque shock generated by an abrupt change of the output current phase can be reduced to a predetermined value or less by predictably operating the output voltage phase during a DC braking on the basis of the output voltage phase of the normal control state when a switch-over from the normal control state to a DC braking state is performed.

More specifically, since the output voltage phase during the DC braking can be operated on the basis of the output voltage phase of the normal control state the phase advanced until the DC braking is initiated, it is possible to provide a control device capable of reducing the torque shock generated by an abrupt change of the output current phase to a predetermined value or less.

More specifically, since the phase advanced until the DC braking is initiated can be calculated on the basis of a setup DC braking initiation frequency, it is possible to provide a control device capable of reducing the torque shock generated by an abrupt change of the output current phase to a predetermined value or less.

More specifically, since the phase advanced until the DC braking is initiated can be operated on the basis of the deceleration rate and the setup DC braking initiation frequency, it is possible to provide a control device capable of reducing the torque shock generated by an abrupt change of the output current phase to a predetermined value or less.

More specifically, it is possible to provide a control device capable of reducing the torque shock generated during a restart to a predetermined value or less by controlling the output voltage phase during the DC braking, predicted by the method of predictably operating the output voltage phase during the DC braking, with respect to the coordinate axis of the normal control.

DESCRIPTION OF REFERENCE NUMERALS AND SIGNS

1: POWER CONVERTER
2: AC MOTOR
3: CURRENT DETECTOR
4: d-q CONVERTER
5: TORQUE CURRENT CONTROLLER
6: EXCITATION CURRENT CONTROLLER
7: PHASE CONVERTER
8: INTEGRATOR
9: VOLTAGE ARITHMETIC UNIT
10: PWM ARITHMETIC UNIT
11: VOLTAGE PHASE PREDICTION ARITHMETIC UNIT
12: PHASE PREDICTOR
13: PRIMARY CURRENT CONTROLLER
101: DC BRAKING CONTROL ARITHMETIC UNIT
102: VELOCITY CONTROL ARITHMETIC UNIT
103: MAGNETIC FLUX ARITHMETIC UNIT
104: d and q AXES ACR
105: INVERSE d-q CONVERTER
106: PWM ARITHMETIC UNIT
107: POWER CONVERSION CIRCUIT
108: SLIDING COMPENSATION ARITHMETIC UNIT
109: INTEGRATOR
110: VELOCITY DETECTION ARITHMETIC UNIT
111: d-q CONVERSION UNIT
112: POSITION DETECTOR
113: INDUCTION MOTOR
114: BRAKING FORCE TARGET VALUE OF DC BRAKING
S1, S2, S3, S4, S101, S103 and S104: SWITCHES

BEST MODE FOR CARRYING OUT THE INVENTION

Hereinafter, the embodiments of the present invention will be described in detail with reference to the accompanying drawings.

EMBODIMENT 1

Figure 1:
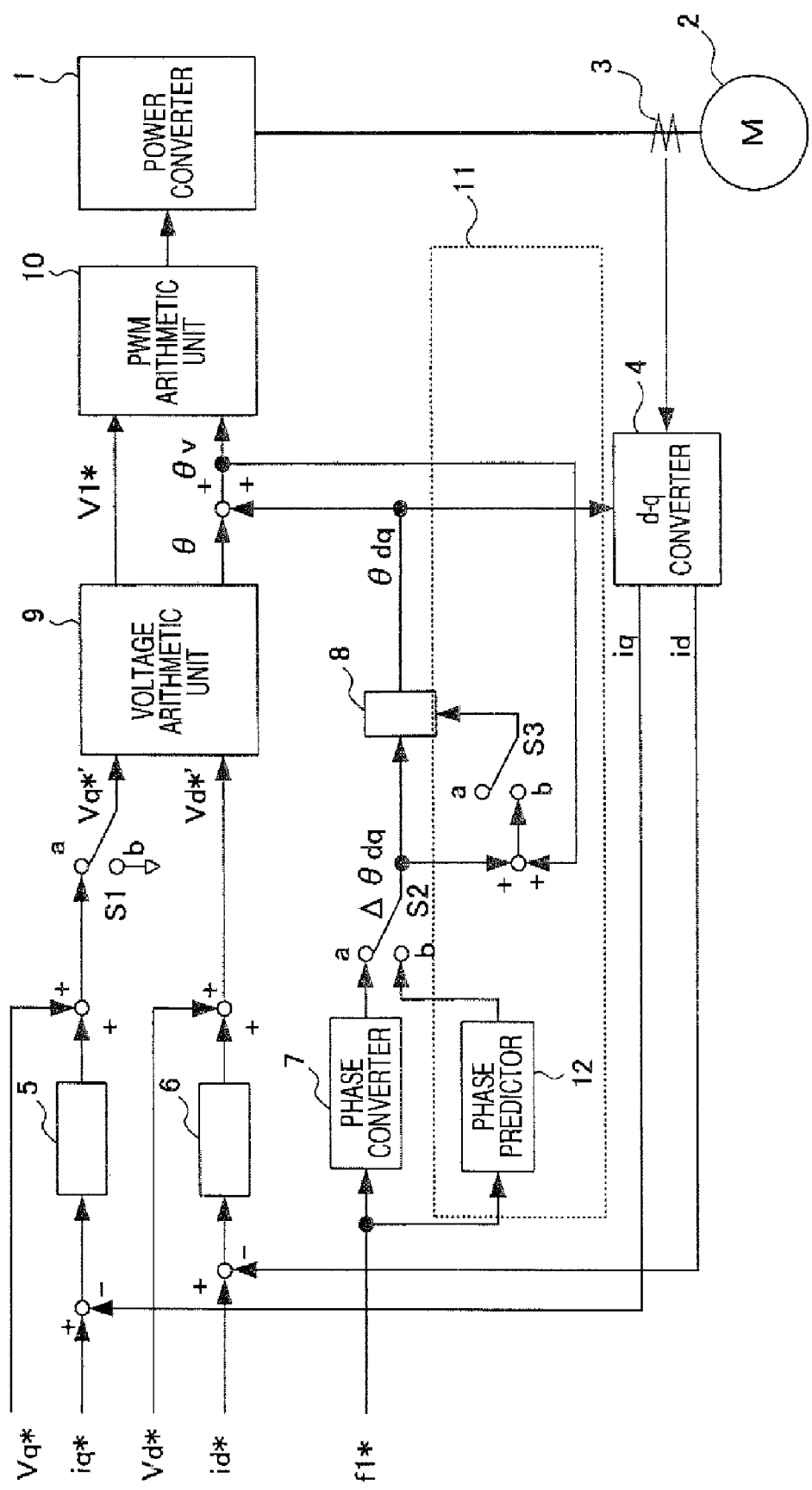
FIG. 1 is a flowchart illustrating a method of applying a control device of an induction motor according to the first embodiment of the present invention.
Figure 2:
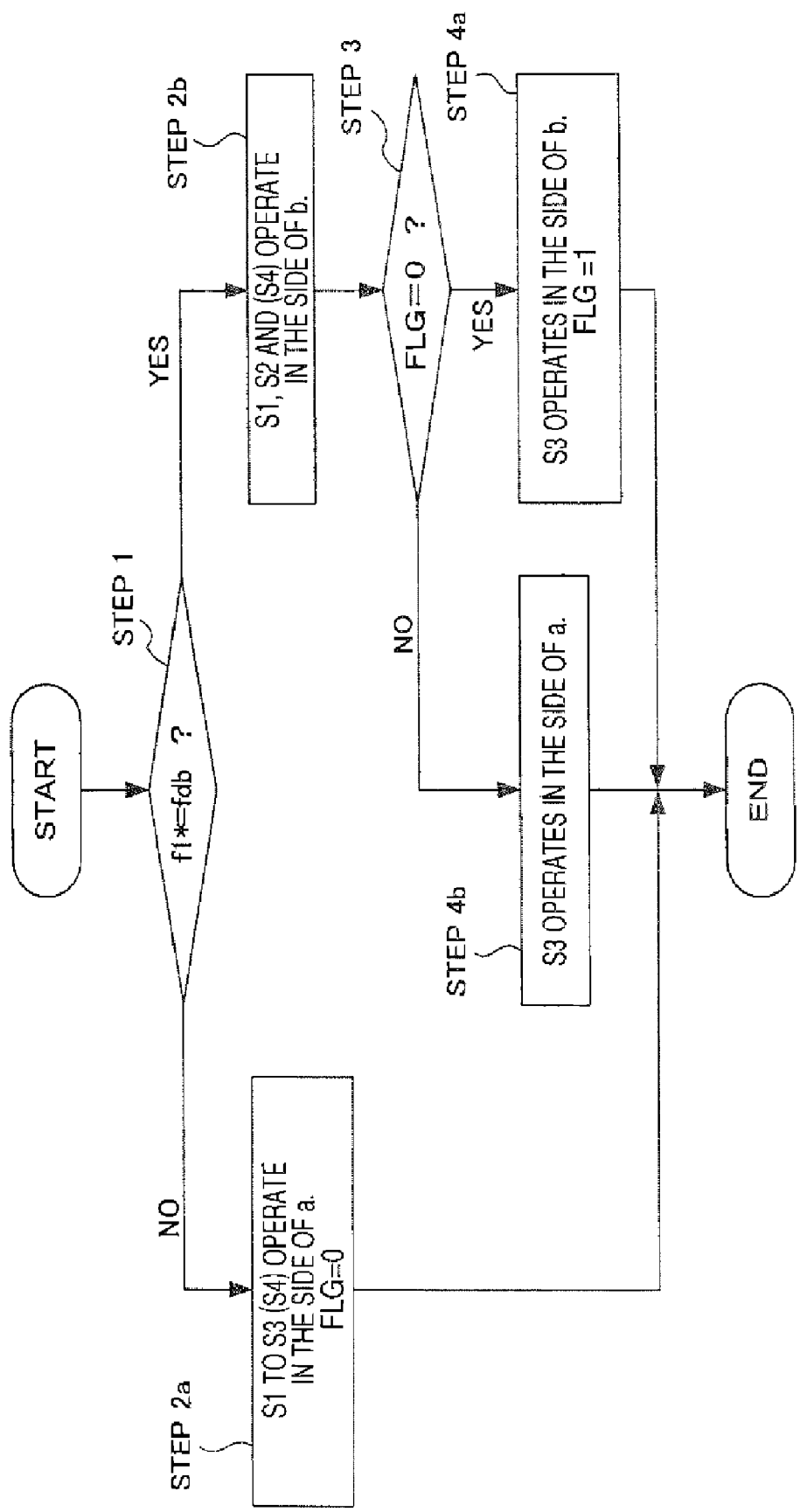
FIG. 2 is a flowchart illustrating a processing sequence of a method according to the present invention.

FIG. 1 is a flowchart illustrating a control device of an induction motor for applying a method according the first embodiment of the invention, and FIG. 2 is a flowchart illustrating a processing sequence of the present invention. The control device of an induction motor according to the present embodiment includes a power converter 1, an induction motor 2, a current detector 3, a d-q converter 4, a torque current controller 5, an excitation current controller 6, a phase converter 7, an integrator 8, a voltage arithmetic unit 9, a PWM arithmetic unit 10, a voltage phase prediction arithmetic unit 11, a phase predictor 12, and switches S1, S2, and S3. The power converter 1 converts a three phase AC current into a DC voltage having a predetermined frequency and voltage using a power element through a PWM control method and supplies it to the induction motor 2. The current detector 3 detects the current supplied to the induction motor 2. The d-q converter 4 separates the current detected by the current detector 3 into a torque current detection value iq and an excitation current detection value id. The torque current controller 5 operates the q-axis voltage correction value Vqc such that the received torque current instruction value iq* corresponds with the torque current detection value iq. The excitation current controller 6 operates the d-axis voltage correction value Vdc so that the received excitation current instruction value id* corresponds with the excitation current detection value id. The phase converter 7 converts the received frequency f1* into a phase amount $\Delta\theta dq$ between the samplings. The integrator 8 integrates the value $\Delta\theta dq$ output from the phase converter 7 to operate a magnetic flux phase $\theta dq$. The voltage arithmetic unit 9 operates a primary voltage instruction V1* and a voltage phase $\theta$ using the following equation, on the basis of a d-axis voltage instruction Vd*' obtained by adding the received d-axis voltage instruction Vd* and the d-axis voltage correction value Vdc by setting a q-axis voltage instruction Vq*' to zero or a value obtained by adding the q-axis voltage correction value Vqc and the q-axis voltage instruction Vq* given by the switch S1.

[Equation 1]

$$V1^* = \sqrt{Vd^{*2} + Vq^{*2}} \quad (1)$$

$$\theta = \tan^{-1}\frac{Vq^*}{Vd^*} \quad (2)$$

The PWM arithmetic unit 10 determines a switching pattern of the power converter 1 based on the primary voltage instruction V1* and the output phase θv obtained by adding the voltage phase 8 and the magnetic flux phase θdq. The voltage phase prediction arithmetic unit 11 predictably operates the voltage phase based on the output phase during a switch-over from the normal control state to the DC braking state and the value Δθdq output from the phase predictor. The phase detector 12 predictably calculates the velocity of the induction motor 2 for a switch-over from the normal control state to the DC braking state on the basis of a DC braking initiation frequency or a relationship between the DC braking initiation frequency and a deceleration rate, and converts it to a phase amount Δθdq between the samplings.

Specifically, a step of switching over from the normal control state to the DC braking state will be described with reference to FIG. 2. A step 1 is a step of determining a DC braking state and a normal control state. In this step, it is determined whether or not the received frequency f1* corresponds with the DC braking initiation frequency fdb during a deceleration. If the received frequency f1* is higher than the DC braking initiation frequency, a process advances to a step 2a as the normal control state. If the received frequency f1* corresponds with the DC braking initiation frequency, a process advances to a step 2b. In a step 2a, the switches S1 to S3 are operated in the side of "a" as the normal control state, and the FLG is set to zero (FLG=0), so that a process advances to a step of the PWM arithmetic unit which will be described below. In this case, the q-axis voltage instruction Vq*' obtained by adding the received q-axis voltage instruction Vq* and the q-axis voltage correction value Vqc, and the d-axis voltage instruction Vd*' obtained by adding the received d-axis voltage instruction Vd* and the d-axis voltage correction value Vdc are input to the voltage arithmetic unit 9. The phase amount Δθdq between the samplings is operated by the phase converter 7 on the basis of the received frequency f1*, and the magnetic flux phase θdq is operated by the integrator 8. In the step 2b, as a process of switching over from the normal control state to the DC braking state, the switches S1 and S2 are switched over from the side of "a" to the side of "b". Accordingly, the q-axis voltage instruction Vq*' is set to zero (Vq*'=0), and the phase amount Δθdq between the samplings is predictably calculated by the phase detector 12 on the basis of the DC braking initiation frequency or a relationship between the DC braking initiation frequency and the decelerating rate to obtain the velocity of the induction motor 2. Then, a process advances to a step 3, in which it is determined whether the FLG is "0" or "1". If the FLG is "0", a process advances to a step 4a. If the FLG is "1", a process advances to a step 4b. In the step 4a, the switch S3 is switched over from the side of "a" to the side of "b" in only one time at the instant that the switch-over to the DC braking state is performed, so that a value obtained by adding a voltage phase of the normal control state and the phase amount Δθdq obtained in the step 2a is substituted for the magnetic flux phase θdq to match the phases between the normal control state and the DC braking initiation. In addition, the FLG is set to one (FLG=1) in order to perform this operation in only one time, and a process advances to a step of the PWM arithmetic unit. In the step 4b, since the switch S3 is maintained in the side of "a", any particular processing is not performed for the phase θdq.

In the step of the PWM arithmetic unit, the primary voltage instruction V1* and the voltage phase θ are operated from the d-axis voltage instruction Vd*' and the q-axis voltage instruction Vq*', and the output phase θv is operated from the voltage phase θ and the magnetic flux phase θdq, so that they are set in the PWM arithmetic unit 10 to drive the power converter 1.

Through the steps in the voltage phase prediction arithmetic unit 11, it is possible to accurately predict the magnetic flux phase of the induction motor 2 by predicting the velocity of the induction motor 2 using the phase predictor 12 when a switch-over from the normal control state to the DC braking state is performed. Therefore, the current phase is not abruptly changed when the DC braking is initiated, so that the torque shock can be reduced to a predetermined value or less. In addition, through this method, since the current phase is not abruptly changed regardless of an electromotive load or a restoration load, the torque shock can be reduced to a predetermined value or less.

EMBODIMENT 2

Figure 3:
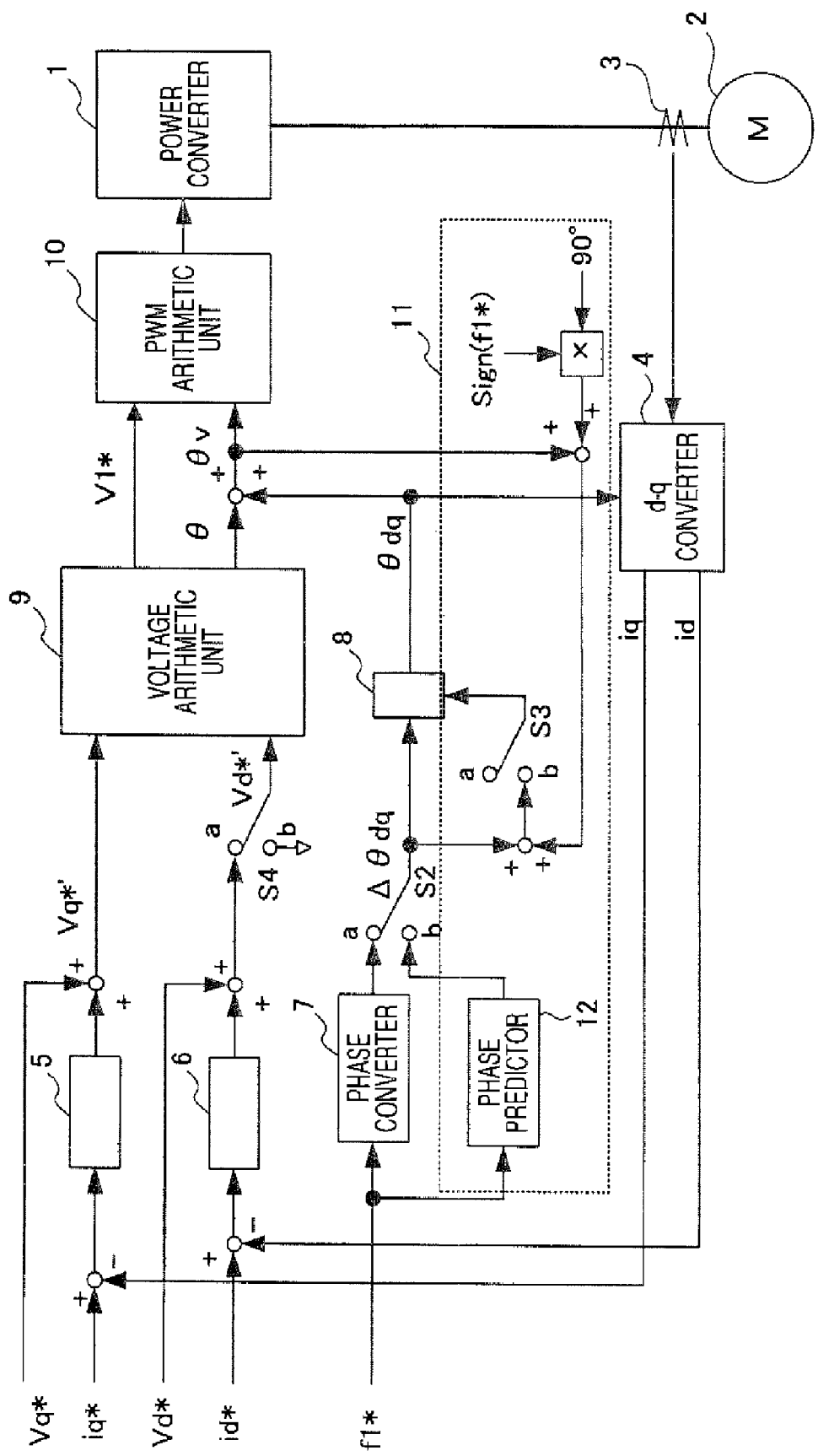
FIG. 3 is a flowchart illustrating a method of applying a control device of an induction motor according to the second embodiment of the present invention.

FIG. 3 is a block diagram illustrating a control device of an induction motor for applying a method according to the second embodiment of the present invention. The control device of an induction motor according to the present embodiment includes a power converter 1, an induction motor 2, a current detector 3, a d-q converter 4, a torque current controller 5, an excitation current controller 6, a phase converter 7, an integrator 8, a voltage arithmetic unit 9, a PWM arithmetic unit 10, a voltage phase prediction arithmetic unit 11, a phase predictor 12, and switches S2, S3, and S4. The power converter 1 converts a three phase AC current into a DC voltage having a predetermined frequency and voltage using a power element through a PWM control method and supplies it to the induction motor 2. The current detector 3 detects the current supplied to the induction motor 2. The d-q converter 4 separates the current detected by the current detector 3 into a torque current detection value iq and an excitation current detection value id. The torque current controller 5 operates the q-axis voltage correction value Vqc such that the received torque current instruction value iq* corresponds with the torque current detection value iq. The excitation current controller 6 operates the d-axis voltage correction value Vdc such that the received excitation current instruction value id* corresponds with the excitation current detection value id. The phase converter 7 converts the received frequency f1* into a phase amount Δθdq between the samplings. The integrator 8 integrates the value Δθdq output from the phase converter 7 to operate the magnetic flux phase θdq. The voltage arithmetic unit 9 operates a primary voltage instruction V1* and a voltage phase θ, on the basis of a q-axis voltage instruction Vq*' obtained by adding the q-axis voltage correction value Vqc and the received q-axis voltage instruction Vq* by setting the d-axis voltage instruction Vd*' to zero or a value obtained by adding the d-axis voltage correction value Vdc and the d-axis voltage instruction Vd* given by the switch S4. The PWM arithmetic unit 10 determines a switching pattern of the power converter 1 based on the primary voltage instruction V1* and the output phase θv obtained by adding the voltage phase θ and the magnetic flux phase θdq. The voltage phase prediction arithmetic unit 11 predictably operates the voltage phase based on the output phase during a switch-over from the normal control state to the DC braking state is performed and the value Δθdq output from the phase predictor. The phase detector 12 predictably calculates the velocity of the induction motor 2 for a switch-over from the normal control state to the DC braking state on the basis of a DC braking initiation frequency or a relationship between the DC braking initiation frequency and a deceleration rate, and converts it to a phase amount Δ∂dq between the samplings.

Specifically, a step of switching over from the normal control state to the DC braking state will be described with reference to FIG. 2. A step 1 is a step of determining a DC braking state and a normal control state. In this step, it is determined whether or not the received frequency f1* corresponds with the DC braking initiation frequency fdb during a deceleration. If the received frequency f1* is higher than the DC braking initiation frequency, a process advances to a step 2a as the normal control state. If the received frequency f1* corresponds with the DC braking initiation frequency, a process advances to a step 2b. In a step 2a, the switches S2 to S4 are operated in the side of "a" as the normal control state, and the FLG is set to zero (FLG=0), so that a process advances to a step of the PWM arithmetic unit which will be described below. In this case, the q-axis voltage instruction Vq*' obtained by adding the received q-axis voltage instruction Vq* and the q-axis voltage correction value Vqc, and the d-axis voltage instruction Vd*' obtained by adding the received d-axis voltage instruction Vd* and the d-axis voltage correction value Vdc are input to the voltage arithmetic unit 9. The phase amount Δ∂dq between the samplings is operated by the phase converter 7 on the basis of the received frequency f1*, and the magnetic flux phase θdq is operated by the integrator 8. In the step 2b, as a process of switching over from the normal control state to the DC braking state, the switches S2 and S4 re switched over from the side of "a" to the side of "b". Accordingly, the q-axis voltage instruction Vq*' is set to zero (Vq*'=0), and the phase amount Δθdq between the samplings is predictably calculated by the phase detector 12 on the basis of the DC braking initiation frequency or a relationship between the DC braking initiation frequency and the decelerating rate to obtain the velocity of the induction motor 2. Then, a process advances to a step 3, in which it is determined whether the FLG is "0" or "1". If the FLG is "0", a process advances to a step 4a. If the FLG is "1", a process advances to a step 4b. In the step 4a, the switch S3 is switched over from the side of "a" to the side of "b" in only one time at the instant that the switch-over to the DC braking state is performed, and the voltage phase θv of the normal control state is rotate by 90°. However, its rotation direction is determined by the sign of the received frequency f1*. A valued obtained by adding this phase angle and the phase amount Δθdq obtained in the step 2a is substituted for the magnetic flux phase θdq to match the phases between the normal control state and the DC braking initiation. In addition, the FLG is set to one (FLG=1) in order to perform this operation in only one time, and a process advances to a step of the PWM arithmetic unit. In the step 4b, since the switch S3 is maintained in the side of "a", any particular processing is not performed for the phase θdq.

In the step of the PWM arithmetic unit, the primary voltage instruction V1* and the voltage phase E are operated from the d-axis voltage instruction Vd*' and the q-axis voltage instruction Vq*', and the output phase θv is operated from the voltage phase θ and the magnetic flux phase θdq, so that they are set in the PWM arithmetic unit 10 to drive the power converter 1.

Through the steps in the voltage phase prediction arithmetic unit 11, it is possible to accurately predict the magnetic flux phase of the induction motor 2 by predicting the velocity of the induction motor 2 using the phase predictor 12 when a switch-over from the normal control state to the DC braking state is performed. Therefore, the current phase is not abruptly changed when the DC braking is initiated, so that the torque shock can be reduced to a predetermined value or less. In addition, through this method, since the current phase is not abruptly changed regardless of an electromotive load or a restoration load, the torque shock can be reduced to a predetermined value or less.

EMBODIMENT 3

Figure 4:
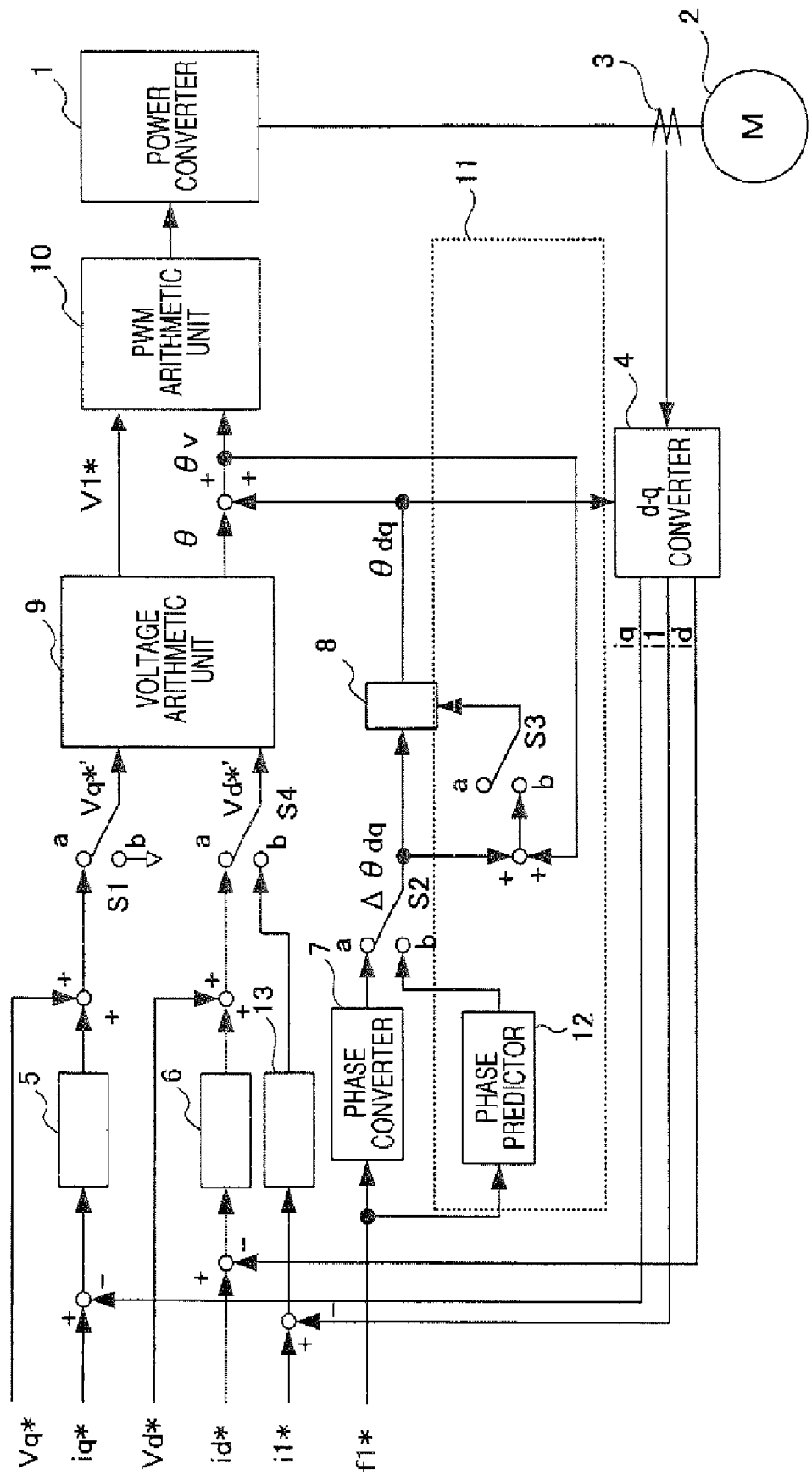
FIG. 4 is a block diagram illustrating a control device of an induction motor for applying a method according to the third embodiment of the present invention.

FIG. 4 is a block diagram illustrating a control device of an induction motor for applying a method according to the third embodiment of the present invention. The control device of an induction motor according to the present embodiment includes a power converter 1, an induction motor 2, a current detector 3, a d-q converter 4, a torque current controller 5, an excitation current controller 6, a phase converter 7, an integrator 8, a voltage arithmetic unit 9, a PWM arithmetic unit 10, a voltage phase prediction arithmetic unit 11, a phase predictor 12, a primary current controller 13, and switches S1, S2, S3, and S4. The power converter 1 converts a three phase AC current into a DC voltage having a predetermined frequency and voltage using a power element through a PWM control method and supplies it to the induction motor 2. The current detector 3 detects the current supplied to the induction motor 2. The d-q converter 4 separates the current detected by the current detector 3 into a torque current detection value iq and an excitation current detection value id. In addition, the primary current detection value i1 is output. The torque current controller 5 operates the q-axis voltage correction value Vqc so that a received torque current instruction value iq* corresponds with the torque current detection value iq. The excitation current controller 6 operates the d-axis voltage correction value Vdc so that the received excitation current instruction value id* corresponds with the excitation current detection value id. The phase converter 7 converts the received frequency f1* into a phase amount Δθdq between the samplings. The integrator 8 integrates the value Δθdq output from the phase converter 7 to operate the magnetic flux phase θdq. The voltage arithmetic unit 9 operates a primary voltage instruction V1* and a voltage phase θ, by setting a q-axis voltage instruction Vq*' to zero or a value obtained by adding the received q-axis voltage instruction Vq* and the q-axis voltage correction value Vqc and by setting a d-axis voltage instruction Vd*' to the primary voltage correction value V1c or a value obtained by adding the d-axis voltage correction value Vdc and the d-axis voltage instruction Vd* given by the switch S4. The PWM arithmetic unit 10 determines a switching pattern of the power converter 1 based on the primary voltage instruction V1* and the output phase θv obtained by adding the voltage phase θ and the magnetic flux phase θdq. The voltage phase prediction arithmetic unit 11 predictably operates the voltage phase based on the output phase during a switch-over from the normal control state to the DC braking state and the value Δθdq output from the phase predictor. The phase detector 12 predictably calculates the velocity of the induction motor 2 for a switch-over from the normal control state to the DC braking state on the basis of a DC braking initiation frequency or a relationship between the DC braking initiation frequency and a deceleration rate, and converts it to a phase amount Δθdq between the samplings. The primary current controller 13 outputs a primary voltage correction value V1c so that the received primary current instruction i1* corresponds with the primary current detection value i1.

Specifically, a step of switching over from the normal control state to the DC braking state will be described with reference to FIG. 2. A step 1 is a step of determining a DC braking state and a normal control state. In this step, it is determined whether or not the received frequency f1* corresponds with the DC braking initiation frequency fdb during a deceleration. If the received frequency f1* is higher than the DC braking initiation frequency, a process advances to a step 2a as the normal control state. If the received frequency f1* corresponds with the DC braking initiation frequency, a process advances to a step 2b.

In a step 2a, the switches S1 to S4 are operated in the side of "a" as the normal control state, and the FLG is set to zero (FLG=0), so that a process advances to a step of the PWM arithmetic unit which will be described below. In this case, a q-axis voltage instruction Vq*' obtained by adding the received q-axis voltage instruction Vq* and the q-axis voltage correction value vqc, and a d-axis voltage instruction Vd*' obtained by adding the received d-axis voltage instruction Vd* and the d-axis voltage correction value Vdc are input to the voltage arithmetic unit 9. The phase amount Δθdq between the samplings is operated by the phase converter 7 on the basis of the received frequency f1*, and the magnetic flux phase θdq is operated by the integrator 8. In the step 2b, as a process of switching over from the normal control state to the DC braking state, the switches S1, S2, and S4 are switched over from the side of "a" to the side of "b". Accordingly, the q-axis voltage instruction Vq*' is set to zero (Vq*'=0), the d-axis voltage instruction Vd*' is output such that the primary current instruction i1* given for the DC braking corresponds with the primary current detection value i1, and the phase amount Δθdq between the samplings is predictably calculated by the phase detector 12 on the basis of the DC braking initiation frequency or a relationship between the DC braking initiation frequency and the decelerating rate to obtain the velocity of the induction motor 2. Then, a process advances to a step 3, in which it is determined whether the FLG is "0" or "1". If the FLG is "0", a process advances to a step 4a. If the FLG is "1", a process advances to a step 4b. In the step 4a, the switch S3 is switched over from the side of "a" to the side of "b" in only one time at the instant that the switch-over to the DC braking state is performed, and a value obtained by adding the voltage phase θv of the normal control state and the phase amount Δθdq operated in the step 2a is substituted for the magnetic flux phase θdq to match the phases between the normal control state and the DC braking initiation. In addition, the FLG is set to one (FLG=1) in order to perform this operation in only one time, and a process advances to a step of the PWM arithmetic unit. In the step 4b, since the switch S3 is maintained in the side of "a", any particular processing is not performed for the phase θdq.

In the step of the PWM arithmetic unit, the primary voltage instruction V1* and the voltage phase E are operated from the d-axis voltage instruction Vd*' and the q-axis voltage instruction Vq*', and the output phase θv is operated from the voltage phase θ and the magnetic flux phase θdq, so that they are set in the PWM arithmetic unit 10 to drive the power converter 1.

Through the steps in the voltage phase prediction arithmetic unit 11, it is possible to accurately predict the magnetic flux phase of the induction motor 2 by predicting the velocity of the induction motor 2 using the phase predictor 12 when a switch-over from the normal control state to the DC braking state is performed. Therefore, the current phase is not abruptly changed when the DC braking is initiated, so that the torque shock can be reduced to a predetermined value or less. In addition, through this method, since the current phase is not abruptly changed regardless of an electromotive load or a restoration load, the torque shock can be reduced to a predetermined value or less.

EMBODIMENT 4

Figure 5:
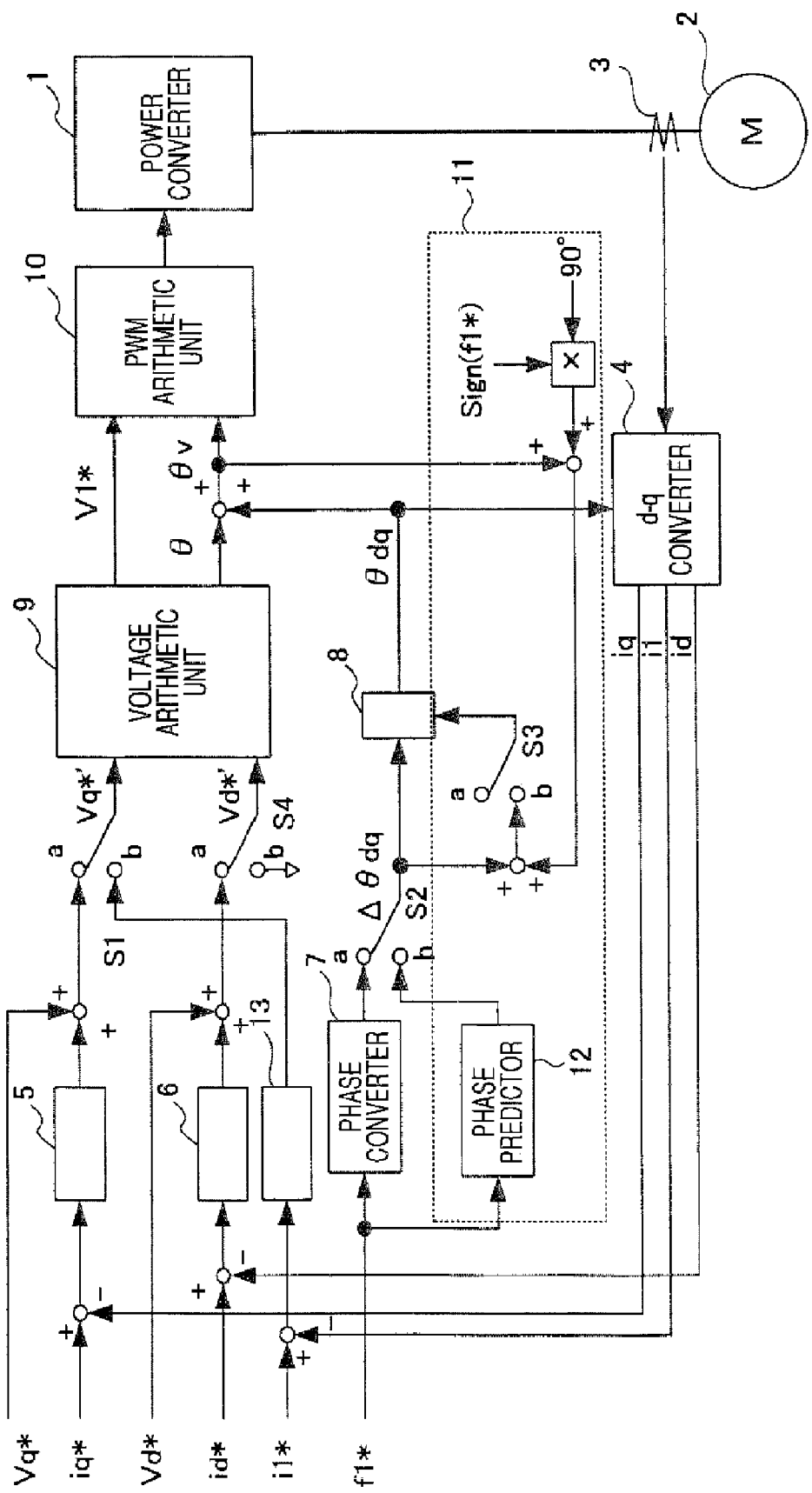
FIG. 5 is a block diagram illustrating a control device of an induction motor for applying a method according to the fourth embodiment of the present invention.

FIG. 5 is a block diagram illustrating a control device of an induction motor for applying a method according to the fourth embodiment of the present invention. The control device of an induction motor according to the present embodiment includes a power converter 1, an induction motor 2, a current detector 3, a d-q converter 4, a torque current controller 5, an excitation current controller 6, a phase converter 7, an integrator 8, a voltage arithmetic unit 9, a PWM arithmetic unit 10, a voltage phase prediction arithmetic unit 11, a phase predictor 12, a primary current controller 13, and switches S1, S2, S3, and S4. The power converter 1 converts a three phase AC current into a DC voltage having a predetermined frequency and voltage using a power element through a PWM control method and supplies it to the induction motor 2. The current detector 3 detects the current supplied to the induction motor 2. The d-q converter 4 separates the current detected by the current detector 3 into a torque current detection value iq and an excitation current detection value id. In addition, the primary current detection value i1 is output. The torque current controller 5 operates the q-axis voltage correction value Vqc so that a received torque current instruction value iq* corresponds with the torque current detection value iq. The excitation current controller 6 operates the d-axis voltage correction value Vdc so that the received excitation current instruction value id* corresponds with the excitation current detection value id. The phase converter 7 converts the received frequency f1* into a phase amount Δθdq between the samplings. The integrator 8 integrates the value Δθdq output from the phase converter 7 to operate the magnetic flux phase θdq. The voltage arithmetic unit 9 operates a primary voltage instruction V1* and a voltage phase θ, by setting the q-axis voltage instruction Vq*' to the primary voltage correction value V1c or a value obtained by adding the q-axis voltage instruction Vq* given by the switch S1 and the q-axis voltage correction value Vqc and by setting a d-axis voltage instruction Vd*' to zero or a value obtained by adding the d-axis voltage instruction Vd* given by the switch S4 and the d-axis voltage correction value Vdc. The PWM arithmetic unit 10 determines a switching pattern of the power converter 1 based on the primary voltage instruction V1* and the output phase θv obtained by adding the voltage phase θ and the magnetic flux phase θdq. The voltage phase prediction arithmetic unit 11 predictably operates the voltage phase based on the output phase during a switch-over from the normal control state to the DC braking state and the value Δθdq output from the phase predictor. The phase detector 12 predictably calculates the velocity of the induction motor 2 for a switch-over from the normal control state to the DC braking state on the basis of a DC braking initiation frequency or a relationship between the DC braking initiation frequency and a deceleration rate, and converts it to a phase amount Δθdq between the samplings. The primary current controller 13 outputs a primary voltage correction value V1c so that the received primary current instruction i1* corresponds with the primary current detection value i1.

Specifically, a step of switching over from the normal control state to the DC braking state will be described with reference to FIG. 2. A step 1 is a step of determining a DC braking state and a normal control state. In this step, it is determined whether or not the received frequency f1* corresponds with the DC braking initiation frequency fdb during a deceleration. If the received frequency f1* is higher than the DC braking initiation frequency, a process advances to a step 2a as the normal control state. If the received frequency f1* corresponds with the DC braking initiation frequency, a process advances to a step 2b. In a step 2a, the switches S1 to S4 are operated in the side of "a" as the normal control state, and the FLG is set to zero (FLG=0), so that a process advances to a step of the PWM arithmetic unit which will be described below. In this case, a q-axis voltage instruction Vq*' obtained by adding the received q-axis voltage instruction vq* and the q-axis voltage correction value Vqc, and a d-axis voltage instruction Vd*' obtained by adding the received d-axis voltage instruction Vd* and the d-axis voltage correction value Vdc are input to the voltage arithmetic unit 9. The phase amount ΔΘdq between the samplings is operated by the phase converter 7 on the basis of the received frequency f1*, and the magnetic flux phase θdq is operated by the integrator 8. In the step 2b, as a process of switching over from the normal control state to the DC braking state, the switches S1, S2, and S4 are switched over from the side of "a" to the side of "b". Accordingly, the q-axis voltage instruction Vq*' is set to zero (Vq*'=0), the d-axis voltage instruction Vd*' is output such that the primary current instruction i1* given for the DC braking corresponds with the primary current detection value i1, and the phase amount ΔΘdq between the samplings is predictably calculated by the phase detector 12 on the basis of the DC braking initiation frequency or a relationship between the DC braking initiation frequency and the decelerating rate to obtain the velocity of the induction motor 2. Then, a process advances to a step 3, in which it is determined whether the FLG is "0" or "1". If the FLG is "0", a process advances to a step 4a. If the FLG is "1", a process advances to a step 4b. In the step 4a, the switch S3 is switched over from the side of "a" to the side of "b" in only one time at the instant that the switch-over to the DC braking state is performed, and the voltage phase θv of the normal control state is rotated by 90°. However, its rotation direction is determined by the sign of the received frequency f1*. A value obtained by adding this phase angle and the phase amount ΔΘdq operated in the step 2a is substituted for the magnetic flux phase θdq so as to match the phases between the normal control state and the DC braking initiation. In addition, the FLG is set to one (FLG=1) in order to perform this operation in only one time, and a process advances to a step of the PWM arithmetic unit. In the step 4b, since the switch S3 is maintained in the side of "a", any particular processing is not performed for the phase θdq.

In the step of the PWM arithmetic unit, the primary voltage instruction V1* and the voltage phase θ are operated from the d-axis voltage instruction Vd*' and the q-axis voltage instruction Vq*', and the output phase θv is operated from the voltage phase θ and the magnetic flux phase θdq, so that they are set in the PWM arithmetic unit 10 to drive the power converter 1.

Through the steps in the voltage phase prediction arithmetic unit 11, it is possible to accurately predict the magnetic flux phase of the induction motor 2 by predicting the velocity of the induction motor 2 using the phase predictor 12 when a switch-over from the normal control state to the DC braking state is performed. Therefore, the current phase is not abruptly changed when the DC braking is initiated, so that the torque shock can be reduced to a predetermined value or less.

In addition, through this method, since the current phase is not abruptly changed regardless of an electromotive load or a restoration load, the torque shock can be reduced to a predetermined value or less.

EMBODIMENT 5

Figure 6:
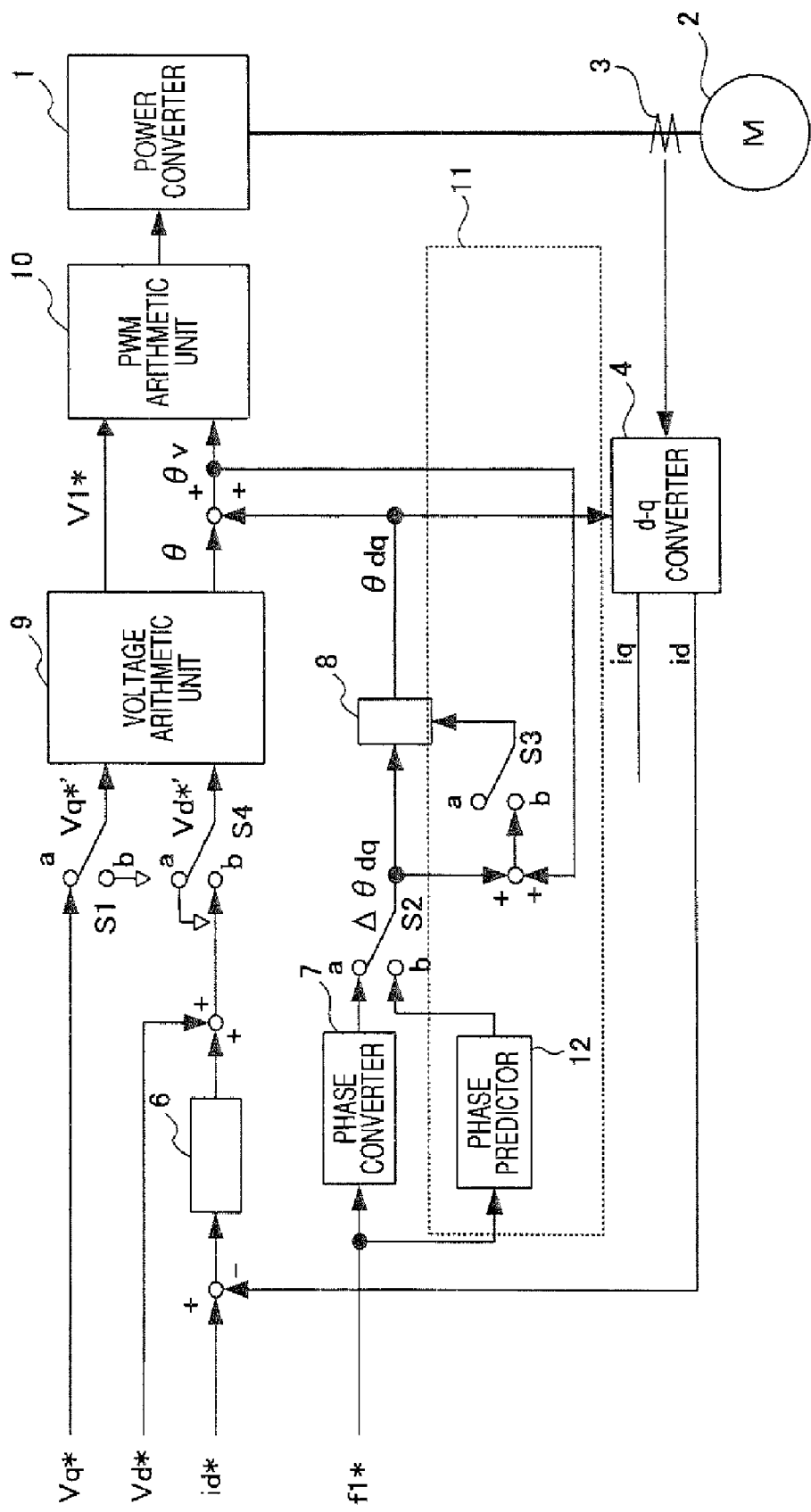
FIG. 6 is a block diagram illustrating a control device of an induction motor for applying a method according to the fifth embodiment of the present invention.

FIG. 6 is a block diagram illustrating a control device of an induction motor for applying a method according to the fifth embodiment of the present invention. The control device of an induction motor according to the present embodiment includes a power converter 1, an induction motor 2, a current detector 3, a d-q converter 4, an excitation current controller 6, a phase converter 7, an integrator 8, a voltage arithmetic unit 9, a PWM arithmetic unit 10, a voltage phase prediction arithmetic unit 11, a phase predictor 12, and switches S1, S2, S3, and S4. The power converter 1 converts a three phase AC current into a DC voltage having a predetermined frequency and voltage using a power element through a PWM control method and supplies it to the induction motor 2. The current detector 3 detects the current supplied to the induction motor 2. The d-q converter 4 separates the current detected by the current detector 3 into a torque current detection value iq and an excitation current detection value id. The excitation current controller 6 operates the d-axis voltage correction value Vdc so that the received excitation current instruction value id* corresponds with the excitation current detection value id. The phase converter 7 converts the received frequency f1* into a phase amount ΔΘdq between the samplings. The integrator 8 integrates the value ΔΘdq output from the phase converter 7 to operate the magnetic flux phase θdq. The voltage arithmetic unit 9 operates a primary voltage instruction V1* and a voltage phase θ, by inputting zero or the q-axis voltage instruction Vq* given by the switch S1 as a q-axis voltage instruction Vq*' and by inputting zero or the d-axis voltage correction value Vdc as a d-axis voltage instruction Vd*' by the switch S4. The PWM arithmetic unit 10 determines a switching pattern of the power converter 1 based on the primary voltage instruction V1* and the output phase θv obtained by adding the voltage phase θ and the magnetic flux phase θdq. The voltage phase prediction arithmetic unit 11 predictably operates the voltage phase based on the output phase during a switch-over from the normal control state to the DC braking state and the value ΔΘdq output from the phase predictor. The phase detector 12 predictably calculates the velocity of the AC motor 2 for a switch-over from the normal control state to the DC braking state on the basis of a DC braking initiation frequency or a relationship between the DC braking initiation frequency and a deceleration rate, and converts it to a phase amount ΔΘdq between the samplings.

Specifically, a step of switching over from the normal control state to the DC braking state will be described with reference to FIG. 2. A step 1 is a step of determining a DC braking state and a normal control state. In this step, it is determined whether or not the received frequency f1* corresponds with the DC braking initiation frequency fdb during a deceleration. If the received frequency f1* is higher than the DC braking initiation frequency, a process advances to a step 2a as the normal control state. If the received frequency f1* corresponds with the DC braking initiation frequency, a process advances to a step 2b. In a step 2a, the switches S1 to S4 are operated in the side of "a" as the normal control state, and the FLG is set to zero (FLG=0), so that a process advances to a step of the PWM arithmetic unit which will be described below. In this case, the q-axis voltage instruction Vq*' is set to the received q-axis voltage instruction Vq*, and the d-axis voltage instruction Vd*' is set to zero (Vd*'=0), so that they are input to the voltage arithmetic unit 9. Accordingly, the phase amount Δθdq between the samplings is operated by the phase converter 7 based on the received frequency f1*, and the integrator 8 operates the magnetic flux phase θdq. In the step 2b, as a process of switching over from the normal control state to the DC braking state, the switches S1, S2, and S4 are switched over from the side of "a" to the side of "b". Accordingly, the q-axis voltage instruction Vq*' is set to zero (Vq*'=0), the d-axis voltage instruction Vd*' is output such that the excitation current instruction id* given for the DC braking corresponds with the excitation current detection value id, and the phase amount Δθdq between the samplings is predictably calculated by the phase detector 12 on the basis of the DC braking initiation frequency or a relationship between the DC braking initiation frequency and the decelerating rate to obtain the velocity of the induction motor 2. Then, a process advances to a step 3, in which it is determined whether the FLG is "0" or "1". If the FLG is "0", a process advances to a step 4a. If the FLG is "1", a process advances to a step 4b. In the step 4a, the switch S3 is switched over from the side of "a" to the side of "b" in only one time at the instant that the switch-over to the DC braking state is performed, and a value obtained by the voltage phase θv of the normal control state and the phase amount Δθdq obtained in the step 2a is substituted for the magnetic flux phase θdq, so as to match the phases between the normal control state and the DC braking initiation. In addition, the FLG is set to one (FLG=1) in order to perform this operation in only one time, and a process advances to a step of the PWM arithmetic unit. In the step 4b, since the switch S3 is maintained in the side of "a", any particular processing is not performed for the phase θdq.

In the step of the PWM arithmetic unit, the primary voltage instruction V1* and the voltage phase θ are operated from the d-axis voltage instruction Vd*' and the q-axis voltage instruction Vq*', and the output phase θv is operated from the voltage phase θ and the magnetic flux phase θdq, so that they are set in the PWM arithmetic unit 10 to drive the power converter 1.

Through the steps in the voltage phase prediction arithmetic unit 11, it is possible to accurately predict the magnetic flux phase of the AC motor 2 by predicting the velocity of the AC motor 2 using the phase predictor 12 when a switch-over from the normal control state to the DC braking state is performed. Therefore, the current phase is not abruptly changed when the DC braking is initiated, so that the torque shock can be reduced to a predetermined value or less. In addition, through this method, since the current phase is not abruptly changed regardless of an electromotive load or a restoration load, the torque shock can be reduced to a predetermined value or less.

EMBODIMENT 6

Figure 7:
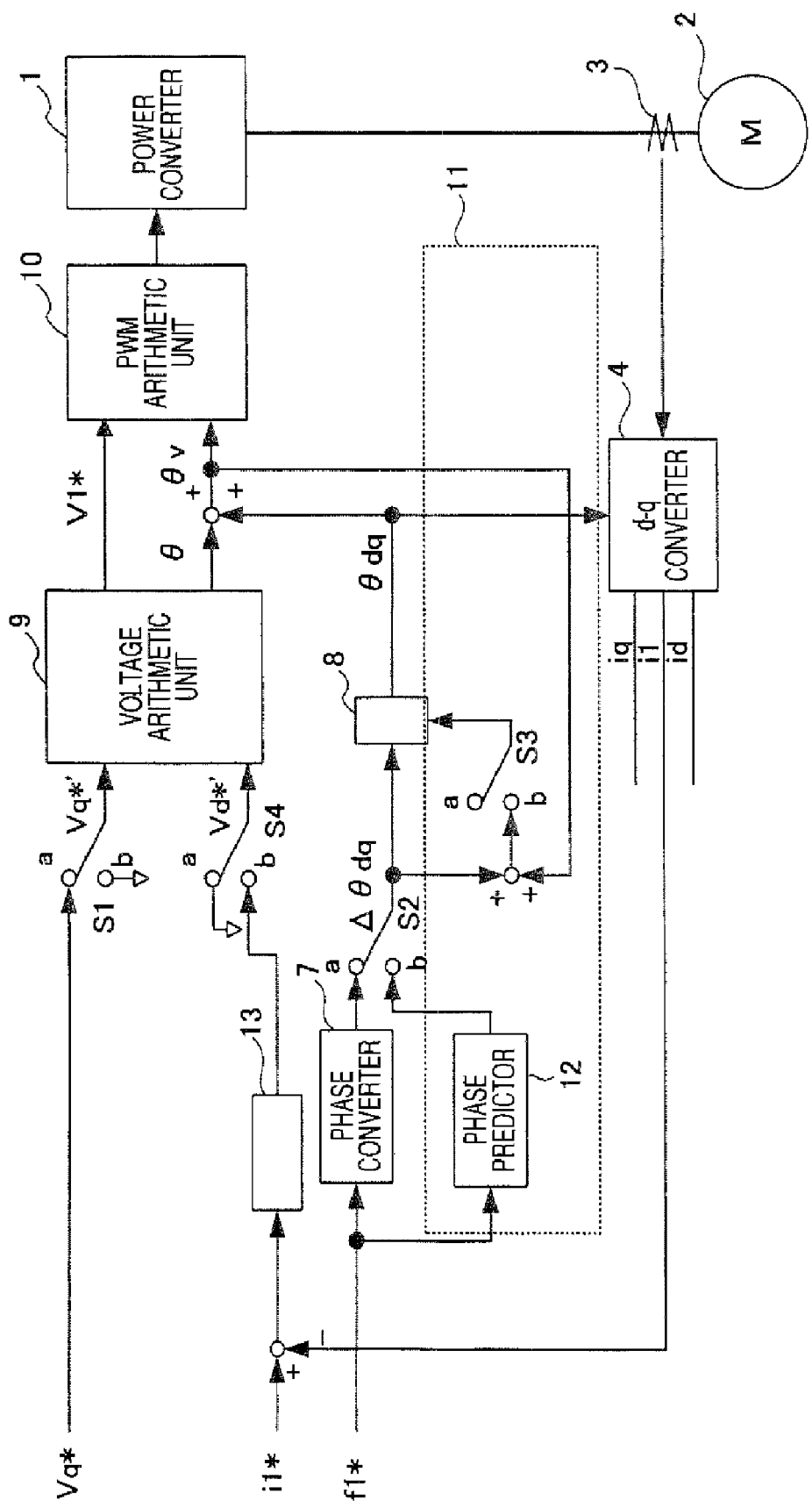
FIG. 7 is a block diagram illustrating a control device of an induction motor for applying a method according to the sixth embodiment of the present invention.

FIG. 7 is a block diagram illustrating a control device of an induction motor for applying a method according to the sixth embodiment of the present invention. The control device of an induction motor according to the present embodiment includes a power converter 1, an AC motor 2, a current detector 3, a d-q converter 4, a phase converter 7, an integrator 8, a voltage arithmetic unit 9, a PWM arithmetic unit 10, a voltage phase prediction arithmetic unit 11, a phase predictor 12, a primary current controller 13, and switches S1, S2, S3, and S4. The power converter 1 converts a three phase AC current into a DC voltage having a predetermined frequency and voltage using a power element through a PWM control method and supplies it to the AC motor 2. The current detector 3 detects the current supplied to the AC motor 2. The d-q converter 4 separates the current detected by the current detector 3 into a torque current detection value iq and an excitation current detection value id. In addition, a primary current detection value i1 is output. The phase converter 7 converts the received frequency f1* into a phase amount Δθdq between the samplings. The integrator 8 integrates the value Δθdq output from the phase converter 7 to operate the magnetic flux phase θdq. The voltage arithmetic unit 9 operates a primary voltage instruction V1* and a voltage phase θ, by inputting zero or the q-axis voltage instruction Vq* given by the switch S1 as a q-axis voltage instruction Vq*' and by inputting zero or the primary voltage correction value V1c as the d-axis voltage instruction vd*' by the switch S4. The PWM arithmetic unit 10 determines a switching pattern of the power converter 1 based on the primary voltage instruction V1* and the output phase θv obtained by adding the voltage phase θ and the magnetic flux phase θdq.

The voltage phase prediction arithmetic unit 11 predictably operates the voltage phase based on the output phase during a switch-over from the normal control state to the DC braking state and the value Δθdq output from the phase predictor. The phase detector 12 predictably calculates the velocity of the AC motor 2 for a switch-over from the normal control state to the DC braking state on the basis of a DC braking initiation frequency or a relationship between the DC braking initiation frequency and a deceleration rate, and converts it to a phase amount Δθdq between the samplings. The primary current controller 13 outputs the primary voltage correction value V1c such that the received primary current instruction i1* corresponds with the primary current detection value i1.

Specifically, a step of switching over from the normal control state to the DC braking state will be described with reference to FIG. 2. A step 1 is a step of determining a DC braking state and a normal control state. In this step, it is determined whether or not the received frequency f1* corresponds with the DC braking initiation frequency fdb during a deceleration. If the received frequency f1* is higher than the DC braking initiation frequency, a process advances to a step 2a as the normal control state. If the received frequency f1* corresponds with the DC braking initiation frequency, a process advances to a step 2b. In a step 2a, the switches S1 to S4 are operated in the side of "a" as the normal control state, and the FLG is set to zero (FLG=0), so that a process advances to a step of the PWM arithmetic unit which will be described below.

In this case, the q-axis voltage instruction Vq*' is set to the received q-axis voltage instruction Vq*, and the d-axis voltage instruction Vd*' is set to zero (Vd*'=0), so that they are input to the voltage arithmetic unit 9. Accordingly, the phase amount Δθdq between the samplings is operated by the phase converter 7 based on the received frequency f1*, and the integrator 8 operates the magnetic flux phase θdq. In the step 2b, as a process of switching over from the normal control state to the DC braking state, the switches S1, S2, and S4 are switched over from the side of "a" to the side of "b". Accordingly, the q-axis voltage instruction Vq*' is set to zero (Vq*'=0), the d-axis voltage instruction Vd*' is set to the primary voltage correction value V1c operated such that the primary current instruction i1* given for a DC braking corresponds with the primary current detection value i1, and the phase amount Δθdq between the samplings is predictably calculated by the phase detector 12 on the basis of the DC braking initiation frequency or a relationship between the DC braking initiation frequency and the decelerating rate to obtain the velocity of the AC motor 2. Then, a process advances to a step 3, in which it is determined whether the FLG is "0" or "1". If the FLG is "0", a process advances to a step 4a. If the FLG is "1", a process advances to a step 4b. In the step 4a, the switch S3 is switched over from the side of "a" to the side of "b" in only one time at the instant that the switch-over to the DC braking state is performed, and a value obtained by the voltage phase θv of the normal control state and the phase amount Δθdq obtained in the step 2a is substituted for the magnetic flux phase θdq, so as to match the phases between the normal control state and the DC braking initiation.

In addition, the FLG is set to one (FLG=1) in order to perform this operation in only one time, and a process advances to a step of the PWM arithmetic unit. In the step 4b, since the switch S3 is maintained in the side of "a", any particular processing is not performed for the phase θdq.

In the step of the PWM arithmetic unit, the primary voltage instruction V1* and the voltage phase θ are operated from the d-axis voltage instruction Vd*' and the q-axis voltage instruction Vq*', and the output phase θv is operated from the voltage phase θ and the magnetic flux phase θdq, so that they are set in the PWM arithmetic unit 10 to drive the power converter 1.

Through the steps in the voltage phase prediction arithmetic unit 11, it is possible to accurately predict the magnetic flux phase of the AC motor 2 by predicting the velocity of the AC motor 2 using the phase predictor 12 when a switch-over from the normal control state to the DC braking state is performed. Therefore, the current phase is not abruptly changed when the DC braking is initiated, so that the torque shock can be reduced to a predetermined value or less. In addition, through this method, since the current phase is not abruptly changed regardless of an electromotive load or a restoration load, the torque shock can be reduced to a predetermined value or less.

EMBODIMENT 7

Figure 8:
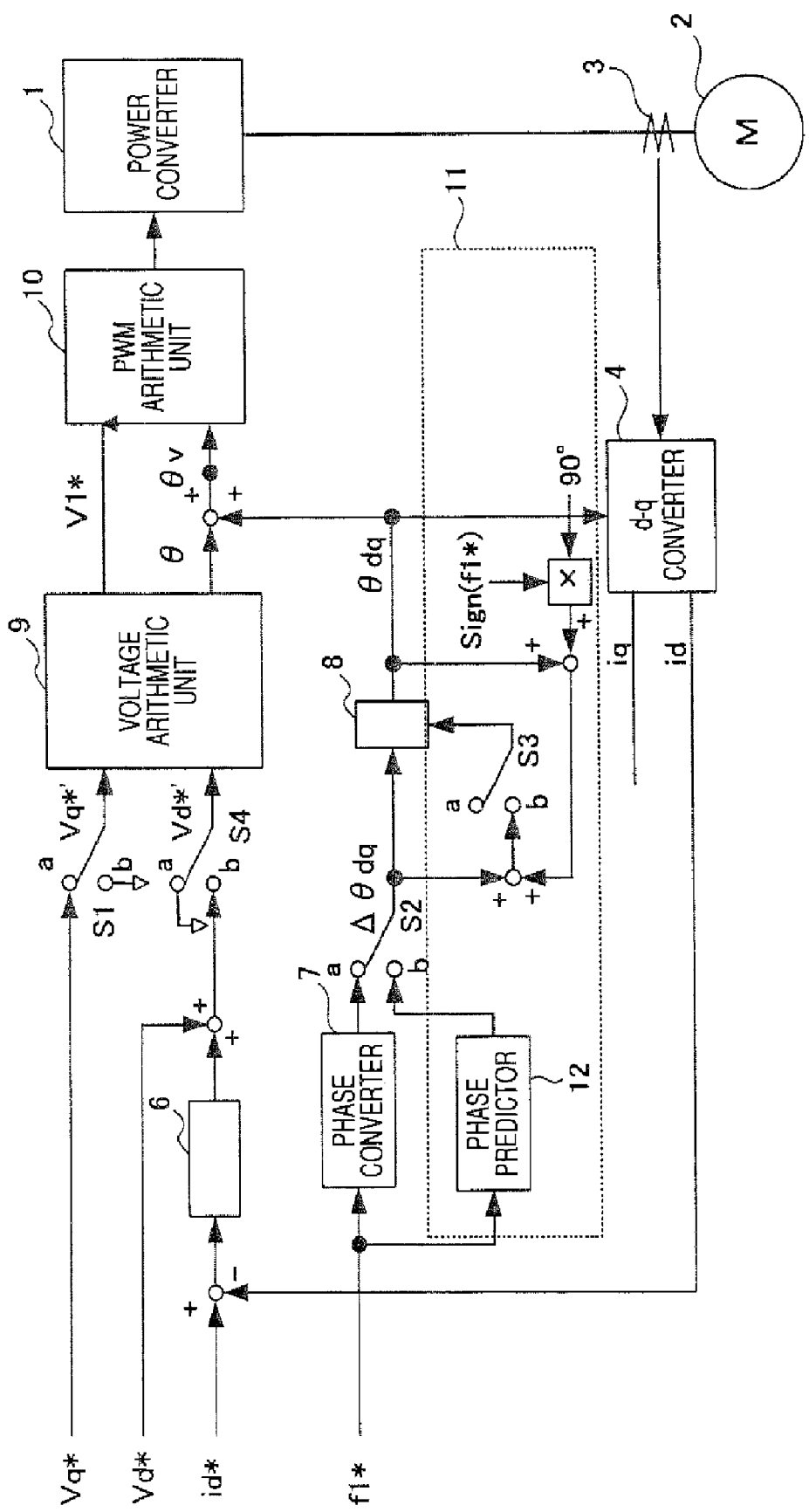
FIG. 8 is a block diagram illustrating a control device of an induction motor for applying a method according to the seventh embodiment of the present invention.

FIG. 8 is a block diagram illustrating a control device of an induction motor for applying a method according to the seventh embodiment of the present invention. The control device of an induction motor according to the present embodiment includes a power converter 1, an induction motor 2, a current detector 3, a d-q converter 4, an excitation current controller 6, a phase converter 7, an integrator 8, a voltage arithmetic unit 9, a PWM arithmetic unit 10, a voltage phase prediction arithmetic unit 11, a phase predictor 12, and switches S1, S2, S3, and S4. The power converter 1 converts a three phase AC current into a DC voltage having a predetermined frequency and voltage using a power element through a PWM control method and supplies it to the induction motor 2. The current detector 3 detects the current supplied to the induction motor 2. The d-q converter 4 separates the current detected by the current detector 3 into a torque current detection value iq and an excitation current detection value id. The excitation current controller 6 operates the d-axis voltage correction value Vdc so that the received excitation current instruction value id* corresponds with the excitation current detection value id. The phase converter 7 converts the received frequency f1* into a phase amount Δθdq between the samplings. The integrator 8 integrates the value Δθdq output from the phase converter 7 to operate the magnetic flux phase θdq. The voltage arithmetic unit 9 operates a primary voltage instruction V1* and a voltage phase θ, by setting a q-axis voltage instruction Vq*' to zero or the q-axis voltage instruction Vq* given by the switch S1 and by setting a d-axis voltage instruction Vd*' to zero or the d-axis voltage correction value Vdc by the switch S4. The PWM arithmetic unit 10 determines a switching pattern of the power converter 1 based on the primary voltage instruction V1* and the output phase θv obtained by adding the voltage phase θ and the magnetic flux phase θdq. The voltage phase prediction arithmetic unit 11 predictably operates the voltage phase based on the output phase during a switch-over from the normal control state to the DC braking state and the value Δθdq output from the phase predictor. The phase detector 12 predictably calculates the velocity of the induction motor 2 for a switch-over from the normal control state to the DC braking state on the basis of a DC braking initiation frequency or a relationship between the DC braking initiation frequency and a deceleration rate, and converts it to a phase amount Δθdq between the samplings.

Specifically, a step of switching over from the normal control state to the DC braking state will be described with reference to FIG. 2. A step 1 is a step of determining a DC braking state and a normal control state. In this step, it is determined whether or not the received frequency f1* corresponds with the DC braking initiation frequency fdb during a deceleration. If the received frequency f1* is higher than the DC braking initiation frequency, a process advances to a step 2a as the normal control state. If the received frequency f1* corresponds with the DC braking initiation frequency, a process advances to a step 2b. In a step 2a, the switches S1 to S4 are operated in the side of "a" as the normal control state, and the FLG is set to zero (FLG=0), so that a process advances to a step of the PWM arithmetic unit which will be described below. In this case, a q-axis voltage instruction Vq* is set to the received q-axis voltage instruction Vq*, and the d-axis voltage instruction Vd* is set to zero (Vd*'=0), so that they are input to the voltage arithmetic unit 9. Accordingly, the phase amount Δθdq between the samplings is operated by the phase converter 7 based on the received frequency f1*, and the integrator 8 operates the magnetic flux phase θdq. In the step 2b, as a process of switching over from the normal control state to the DC braking state, the switches S1, S2, and S4 are switched over from the side of "a" to the side of "b". Accordingly, the q-axis voltage instruction Vq* is set to zero (Vq*'=0), the d-axis voltage instruction Vd* is output such that the received current instruction id* given for the DC control corresponds with the d-axis current detection value id, and the phase amount Δθdq between the samplings is predictably calculated by the phase detector 12 on the basis of the DC braking initiation frequency or a relationship between the DC braking initiation frequency and the decelerating rate to obtain the velocity of the induction motor 2. Then, a process advances to a step 3, in which it is determined whether the FLG is "0" or "1". If the FLG is "0", a process advances to a step 4a. If the FLG is "1", a process advances to a step 4b. In the step 4a, the switch S3 is switched over from the side of "a" to the side of "b" in only one time at the instant that the switch-over to the DC braking state is performed, and the phase θdq of the magnetic flux of the normal control state is rotated by 90°. However, its rotation direction is determined by the sign of the received frequency f1*. A value obtained by adding this phase angle and the phase amount Δθdq operated in the step 2a is substituted for the magnetic flux phase θdq, so as to match the phases between the normal control state and the DC braking initiation. In addition, the FLG is set to one (FLG=1) in order to perform this operation in only one time, and a process advances to a step of the PWM arithmetic unit. In the step 4b, since the switch S3 is maintained in the side of "a", any particular processing is not performed for the phase θdq.

In the step of the PWM arithmetic unit, the primary voltage instruction V1* and the voltage phase θ are operated from the d-axis voltage instruction Vd*' and the q-axis voltage instruction Vq*', and the output phase θv is operated from the voltage phase θ and the magnetic flux phase θdq, so that they are set in the PWM arithmetic unit 10 to drive the power converter 1.

Through the steps in the voltage phase prediction arithmetic unit 11, it is possible to accurately predict the magnetic flux phase of the induction motor 2 by predicting the velocity of the induction motor 2 using the phase predictor 12 when a switch-over from the normal control state to the DC braking state is performed. Therefore, the current phase is not abruptly changed when the DC braking is initiated, so that the torque shock can be reduced to a predetermined value or less. In addition, through this method, since the current phase is not abruptly changed regardless of an electromotive load or a restoration load, the torque shock can be reduced to a predetermined value or less.

EMBODIMENT 8

Figure 9:
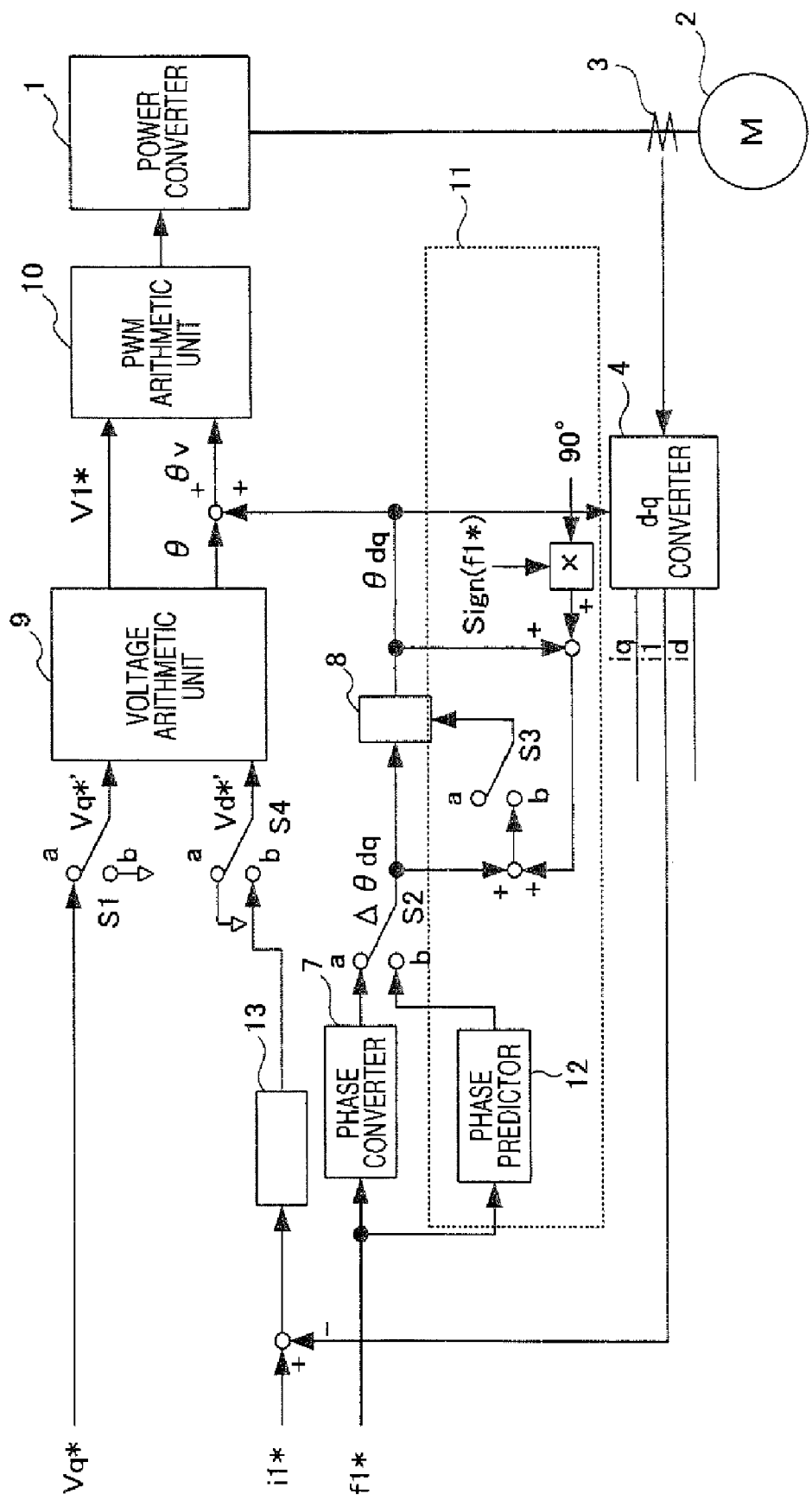
FIG. 9 is a block diagram illustrating a control device of an induction motor for applying a method according to the eighth embodiment of the present invention.

FIG. 9 is a block diagram illustrating a control device of an induction motor for applying a method according to the eighth embodiment of the present invention. The control device of an induction motor according to the present embodiment includes a power converter 1, an induction motor 2, a current detector 3, a d-q converter 4, a phase converter 7, an integrator 8, a voltage arithmetic unit 9, a PWM arithmetic unit 10, a voltage phase prediction arithmetic unit 11, a phase predictor 12, a primary current controller 13, and switches S1, S2, S3, and S4. The power converter 1 converts a three phase AC current into a DC voltage having a predetermined frequency and voltage using a power element through a PWM control method and supplies it to the induction motor 2. The current detector 3 detects the current supplied to the AC motor 2. The d-q converter 4 separates the current detected by the current detector 3 into a torque current detection value iq and an excitation current detection value id. In addition, a primary current detection value i1 is output. The phase converter 7 converts the received frequency f1* into a phase amount Δθdq between the samplings. The integrator 8 integrates the value Δθdq output from the phase converter 7 to operate the magnetic flux phase θdq. The voltage arithmetic unit 9 operates a primary voltage instruction V1* and a voltage phase θ, by setting a q-axis voltage instruction Vq*' to zero or the q-axis voltage instruction Vq* given by the switch S1 and by setting a d-axis voltage instruction Vd*' to zero or the primary voltage correction value V1c by the switch S4. The PWM arithmetic unit 10 determines a switching pattern of the power converter 1 based on the primary voltage instruction V1* and the output phase θv obtained by adding the voltage phase θ and the magnetic flux phase θdq. The voltage phase prediction arithmetic unit 11 predictably operates the voltage phase based on the output phase during a switch-over from the normal control state to the DC braking state and the value Δθdq output from the phase predictor. The phase detector 12 predictably calculates the velocity of the induction motor 2 for a switch-over from the normal control state to the DC braking state on the basis of a DC braking initiation frequency or a relationship between the DC braking initiation frequency and a deceleration rate, and converts it to a phase amount Δθdq between the samplings. The primary current controller 13 outputs the primary voltage correction value V1c such that the received primary current instruction i1* corresponds with the primary current detection value i1.

Specifically, a step of switching over from the normal control state to the DC braking state will be described with reference to FIG. 2. A step 1 is a step of determining a DC braking state and a normal control state. In this step, it is determined whether or not the received frequency f1* corresponds with the DC braking initiation frequency fdb during a deceleration. If the received frequency f1* is higher than the DC braking initiation frequency, a process advances to a step 2a as the normal control state. If the received frequency f1* corresponds with the DC braking initiation frequency, a process advances to a step 2b. In a step 2a, the switches S1 to S4 are operated in the side of "a" as the normal control state, and the FLG is set to zero (FLG=0), so that a process advances to a step of the PWM arithmetic unit which will be described below. In this case, the q-axis voltage instruction Vq*' is set to the received q-axis voltage instruction Vq*, and the d-axis voltage instruction Vd*' is set to zero (Vd*'=0), so that they are input to the voltage arithmetic unit 9. Accordingly, the phase amount Δθdq between the samplings is operated by the phase converter 7 based on the received frequency f1*, and the integrator 8 operates the magnetic flux phase θdq. In the step 2b, as a process of switching over from the normal control state to the DC braking state, the switches S1, S2, and S4 are switched over from the side of "a" to the side of "b". Accordingly, the q-axis voltage instruction Vq*' is set to zero (Vq*'=0), the primary voltage correction value V1c operated such that the primary current instruction i1* given for a DC control corresponds with the primary current detection value i1 is output as the d-axis voltage instruction Vd*', and the phase amount Δθdq between the samplings is predictably calculated by the phase detector 12 on the basis of the DC braking initiation frequency or a relationship between the DC braking initiation frequency and the decelerating rate to obtain the velocity of the induction motor 2. Then, a process advances to a step 3, in which it is determined whether the FLG is "0" or "1". If the FLG is "0", a process advances to a step 4a. If the FLG is "1", a process advances to a step 4b. In the step 4a, the switch S3 is switched over from the side of "a" to the side of "b" in only one time at the instant that the switch-over to the DC braking state is performed, and the magnetic flux phase θdq of the normal control state is rotated by 90°. However, its rotation direction is determined by the sign of the received frequency f1*. A value obtained by adding this phase angle and the phase amount Δθdq operated in the step 2a is substituted for the magnetic flux phase θdq, so as to match the phases between the normal control state and the DC braking initiation. In addition, the FLG is set to one (FLG=1) in order to perform this operation in only one time, and a process advances to a step of the PWM arithmetic unit. In the step 4b, since the switch S3 is maintained in the side of "a", any particular processing is not performed for the phase θdq.

In the step of the PWM arithmetic unit, the primary voltage instruction V1* and the voltage phase θ are operated from the d-axis voltage instruction Vd*' and the q-axis voltage instruction Vq*', and the output phase θv is operated from the voltage phase θ and the magnetic flux phase θdq, so that they are set in the PWM arithmetic unit 10 to drive the power converter 1.

Through the steps in the voltage phase prediction arithmetic unit 11, it is possible to accurately predict the magnetic flux phase of the induction motor 2 by predicting the velocity of the induction motor 2 using the phase predictor 12 when a switch-over from the normal control state to the DC braking state is performed. Therefore, the current phase is not abruptly changed when the DC braking is initiated, so that the torque shock can be reduced to a predetermined value or less.

In addition, through this method, since the current phase is not abruptly changed regardless of an electromotive load or a restoration load, the torque shock can be reduced to a predetermined value or less.

EMBODIMENT 9

Figure 10:
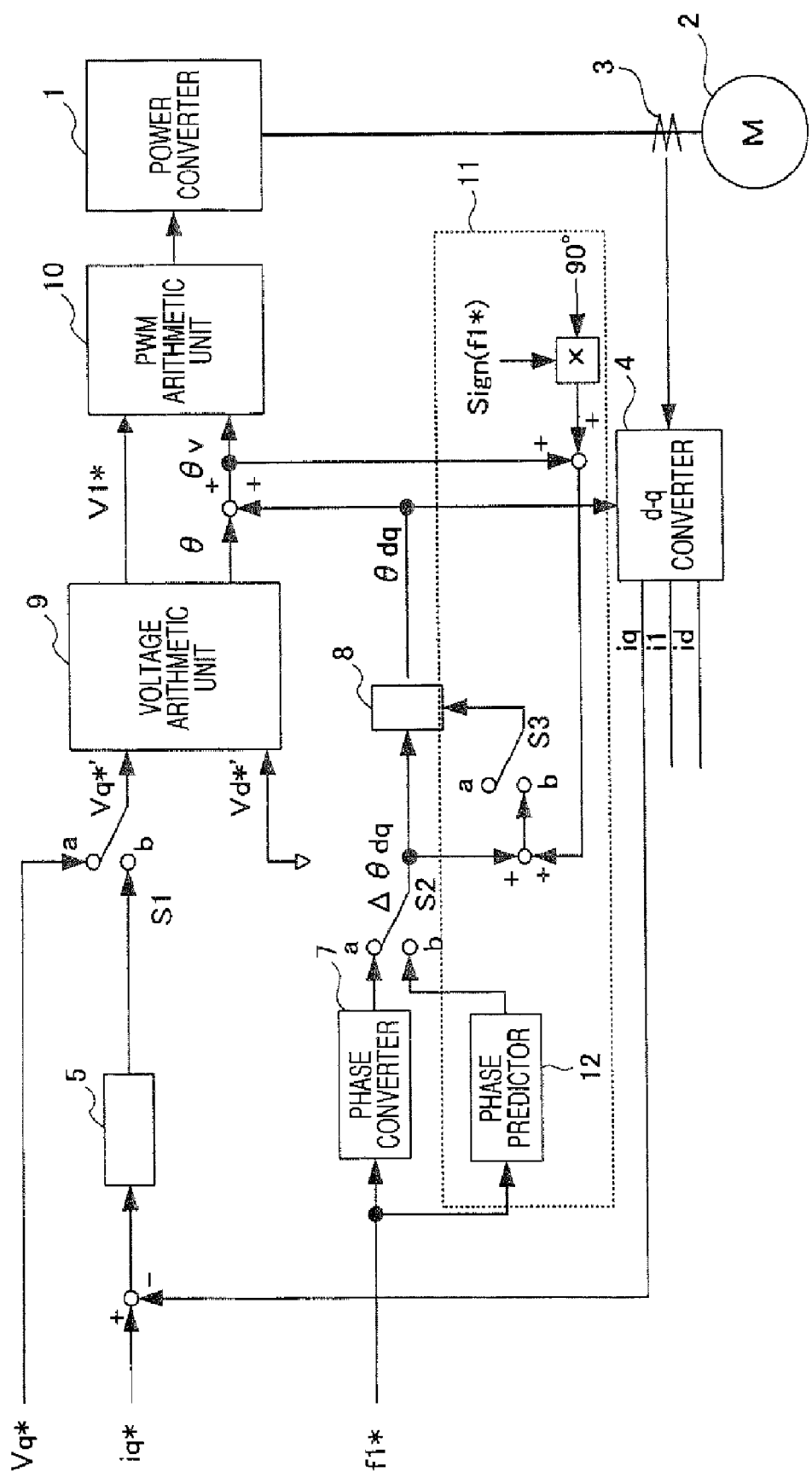
FIG. 10 is a block diagram illustrating a control device of an induction motor for applying a method according to the ninth embodiment of the present invention.

FIG. 10 is a block diagram illustrating a control device of an induction motor for applying a method according to the ninth embodiment of the present invention. The control device of an induction motor according to the present embodiment includes a power converter 1, an induction motor 2, a current detector 3, a d-q converter 4, a torque current controller 5, a phase converter 7, an integrator 8, a voltage arithmetic unit 9, a PWM arithmetic unit 10, a voltage phase prediction arithmetic unit 11, a phase predictor 12, and switches S1, S2, and S3. The power converter 1 converts a three phase AC current into a DC voltage having a predetermined frequency and voltage using a power element through a PWM control method and supplies it to the induction motor 2. The current detector 3 detects the current supplied to the induction motor 2. The d-q converter 4 separates the current detected by the current detector 3 into a torque current detection value iq and an excitation current detection value id. In addition, a primary current detection value i1 is output. The torque current controller 5 operates the q-axis voltage correction value Vqc such that the received excitation current instruction value id* corresponds with the torque current detection value iq. The phase converter 7 converts the received frequency f1* into a phase amount ΔΘdq between the samplings. The integrator 8 integrates the value ΔΘdq output from the phase converter 7 to operate the magnetic flux phase Θdq. The voltage arithmetic unit 9 operates a primary voltage instruction V1* and a voltage phase Θ, by setting a q-axis voltage instruction Vq*' to a q-axis voltage correction value Vqc or the q-axis voltage instruction Vq* given by the switch S1 and by setting a d-axis voltage instruction Vd*' to zero. The PWM arithmetic unit 10 determines a switching pattern of the power converter 1 based on the primary voltage instruction V1* and the output phase Θv obtained by adding the voltage phase Θ and the magnetic flux phase Θdq. The voltage phase prediction arithmetic unit 11 predictably operates the voltage phase based on the output phase during a switch-over from the normal control state to the DC braking state and the value ΔΘdq output from the phase predictor. The phase detector 12 predictably calculates the velocity of the induction motor 2 for a switch-over from the normal control state to the DC braking state on the basis of a DC braking initiation frequency or a relationship between the DC braking initiation frequency and a deceleration rate, and converts it to a phase amount ΔΘdq between the samplings.

Specifically, a step of switching over from the normal control state to the DC braking state will be described with reference to FIG. 2. A step 1 is a step of determining a DC braking state and a normal control state. In this step, it is determined whether or not the received frequency f1* corresponds with the DC braking initiation frequency fdb during a deceleration. If the received frequency f1* is higher than the DC braking initiation frequency, a process advances to a step 2a as the normal control state. If the received frequency f1* corresponds with the DC braking initiation frequency, a process advances to a step 2b. In a step 2a, the switches S1 to S3 are operated in the side of "a" as the normal control state, and the FLG is set to zero (FLG=0), so that a process advances to a step of the PWM arithmetic unit which will be described below. In this case, a q-axis voltage instruction Vq* is set to the received q-axis voltage instruction Vq*, and the d-axis voltage instruction Vd* is set to zero (Vd*'=0), so that they are input to the voltage arithmetic unit 9. Accordingly, the phase amount ΔΘdq between the samplings is operated by the phase converter 7 based on the received frequency f1*, and the integrator 8 operates the magnetic flux phase Θdq. In the step 2b, as a process of switching over from the normal control state to the DC braking state, the switches S1 and S2 are switched over from the side of "a" to the side of "b". Accordingly, the d-axis voltage instruction Vd*' is set to zero (vd*'=0), the q-axis voltage correction value Vqc operated such that the received current instruction iq* given for the DC control corresponds with the q-axis current detection value iq is output as the q-axis voltage instruction Vq*', and the phase amount ΔΘdq between the samplings is predictably calculated by the phase detector 12 on the basis of the DC braking initiation frequency or a relationship between the DC braking initiation frequency and the decelerating rate to obtain the velocity of the induction motor 2. Then, a process advances to a step 3, in which it is determined whether the FLG is "0" or "1". If the FLG is "0", a process advances to a step 4a. If the FLG is "1", a process advances to a step 4b. In the step 4a, the switch S3 is switched over from the side of "a" to the side of "b" in only one time at the instant that the switch-over to the DC braking state is performed, and the voltage phase Θv of the normal control state is rotated by 90°. However, its rotation direction is determined by the sign of the received frequency f1*. A value obtained by adding this phase angle and the phase amount ΔΘdq operated in the step 2a is substituted for the magnetic flux phase Θdq, so as to match the phases between the normal control state and the DC braking initiation. In addition, the FLG is set to one (FLG=1) in order to perform this operation in only one time, and a process advances to a step of the PWM arithmetic unit. In the step 4b, since the switch S3 is maintained in the side of "a", any particular processing is not performed for the phase Θdq. In the step of the PWM arithmetic unit, the primary voltage instruction V1* and the voltage phase Θ are operated from the d-axis voltage instruction Vd*' and the q-axis voltage instruction Vq*', and the output phase Θv is operated from the voltage phase Θ and the magnetic flux phase Θdq, so that they are set in the PWM arithmetic unit 10 to drive the power converter 1.

Through the steps in the voltage phase prediction arithmetic unit 11, it is possible to accurately predict the magnetic flux phase of the induction motor 2 by predicting the velocity of the induction motor 2 using the phase predictor 12 when a switch-over from the normal control state to the DC braking state is performed. Therefore, the current phase is not abruptly changed when the DC braking is initiated, so that the torque shock can be reduced to a predetermined value or less. In addition, through this method, since the current phase is not abruptly changed regardless of an electromotive load or a restoration load, the torque shock can be reduced to a predetermined value or less.

EMBODIMENT 10

Figure 11:
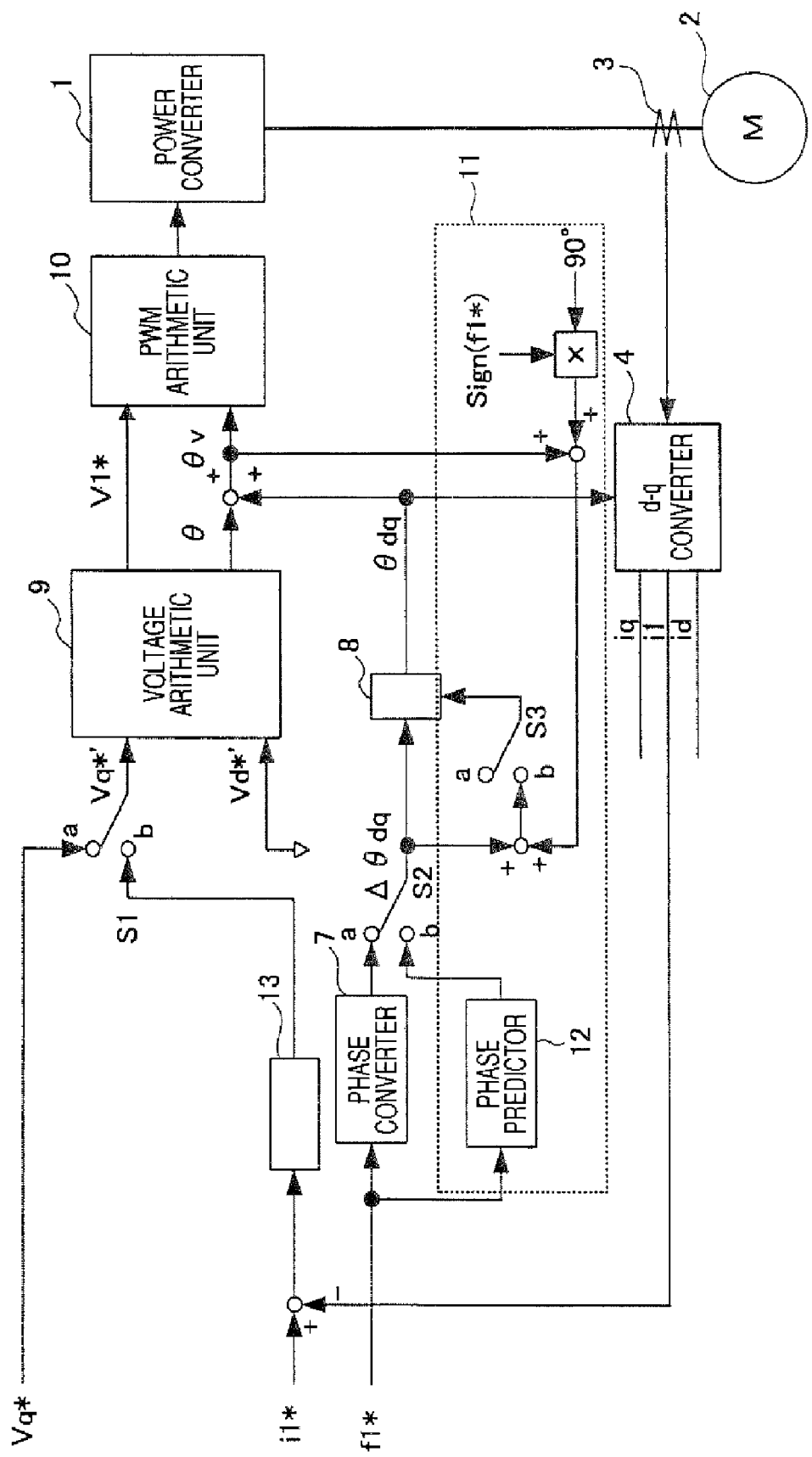
FIG. 11 is a block diagram illustrating a control device of an induction motor for applying a method according to the tenth embodiment of the present invention.

FIG. 11 is a block diagram illustrating a control device of an induction motor for applying a method according to the tenth embodiment of the present invention. The control device of an induction motor according to the present embodiment includes a power converter 1, an induction motor 2, a current detector 3, a d-q converter 4, a phase converter 7, an integrator 8, a voltage arithmetic unit 9, a PWM arithmetic unit 10, a voltage phase prediction arithmetic unit 11, a phase predictor 12, a primary current controller 13, and switches S1, S2, and S3. The power converter 1 converts a three phase AC current into a DC voltage having a predetermined frequency and voltage using a power element through a PWM control method and supplies it to the induction motor 2. The current detector 3 detects the current supplied to the AC motor 2. The d-q converter 4 separates the current detected by the current detector 3 into a torque current detection value iq and an excitation current detection value id. In addition, a primary current detection value i1 is output. The phase converter 7 converts the received frequency f1* into a phase amount Δθdq between the samplings. The integrator 8 integrates the value Δθdq output from the phase converter 7 to operate the magnetic flux phase θdq. The voltage arithmetic unit 9 operates a primary voltage instruction V1* and a voltage phase θ, by setting a q-axis voltage instruction Vq*' to the q-axis voltage instruction Vq* given by the switch S1 or the primary voltage correction value V1c and by setting a d-axis voltage instruction Vd*' to zero. The PWM arithmetic unit 10 determines a switching pattern of the power converter 1 based on the primary voltage instruction V1* and the output phase θv obtained by adding the voltage phase θ and the magnetic flux phase θdq. The voltage phase prediction arithmetic unit 11 predictably operates the voltage phase based on the output phase during a switch-over from the normal control state to the DC braking state and the value Δθdq output from the phase predictor. The phase detector 12 predictably calculates the velocity of the induction motor 2 for a switch-over from the normal control state to the DC braking state on the basis of a DC braking initiation frequency or a relationship between the DC braking initiation frequency and a deceleration rate, and converts it to a phase amount Δθdq between the samplings. The primary current controller 13 outputs the primary voltage correction value V1c such that the received primary current instruction i1* corresponds with the primary current detection value i1.

Specifically, a step of switching over from the normal control state to the DC braking state will be described with reference to FIG. 2. A step 1 is a step of determining a DC braking state and a normal control state. In this step, it is determined whether or not the received frequency f1* corresponds with the DC braking initiation frequency fdb during a deceleration. If the received frequency f1* is higher than the DC braking initiation frequency, a process advances to a step 2a as the normal control state. If the received frequency f1* corresponds with the DC braking initiation frequency, a process advances to a step 2b. In a step 2a, the switches S1 to S3 are operated in the side of "a" as the normal control state, and the FLG is set to zero (FLG=0), so that a process advances to a step of the PWM arithmetic unit which will be described below. In this case, the q-axis voltage instruction Vq*' is set to the received q-axis voltage instruction Vq*, and the d-axis voltage instruction Vd*' is set to zero (Vd*'=0), so that they are input to the voltage arithmetic unit 9. Accordingly, the phase amount Δθdq between the samplings is operated by the phase converter 7 based on the received frequency f1*, and the integrator 8 operates the magnetic flux phase θdq. In the step 2b, as a process of switching over from the normal control state to the DC braking state, the switches S1 and S2, are switched over from the side of "a" to the side of "b". Accordingly, the d-axis voltage instruction Vd*' is set to zero (Vd*'=0), the primary voltage correction value V1c operated such that the primary current instruction i1* given for a DC control corresponds with the primary current detection value i1 is output as the q-axis voltage instruction Vq*', and the phase amount Δθdq between the samplings is predictably calculated by the phase detector 12 on the basis of the DC braking initiation frequency or a relationship between the DC braking initiation frequency and the decelerating rate to obtain the velocity of the induction motor 2. Then, a process advances to a step 3, in which it is determined whether the FLG is "0" or "1". If the FLG is "0", a process advances to a step 4a. If the FLG is "1", a process advances to a step 4b. In the step 4a, the switch S3 is switched over from the side of "a" to the side of "b" in only one time at the instant that the switch-over to the DC braking state is performed, and the voltage phase θv of the normal control state is rotated by 90°. However, its rotation direction is determined by the sign of the received frequency f1*. A value obtained by adding this phase angle and the phase amount Δθdq operated in the step 2a is substituted for the magnetic flux phase θdq, so as to match the phases between the normal control state and the DC braking initiation. In addition, the FLG is set to one (FLG=1) in order to perform this operation in only one time, and a process advances to a step of the PWM arithmetic unit. In the step 4b, since the switch S3 is maintained in the side of "a", any particular processing is not performed for the phase θdq. In the step of the PWM arithmetic unit, the primary voltage instruction V1* and the voltage phase θ are operated from the d-axis voltage instruction Vd*' and the q-axis voltage instruction Vq*', and the output phase θv is operated from the voltage phase θ and the magnetic flux phase θdq, so that they are set in the PWM arithmetic unit 10 to drive the power converter 1.

Through the steps in the voltage phase prediction arithmetic unit 11, it is possible to accurately predict the magnetic flux phase of the induction motor 2 by predicting the velocity of the induction motor 2 using the phase predictor 12 when a switch-over from the normal control state to the DC braking state is performed. Therefore, the current phase is not abruptly changed when the DC braking is initiated, so that the torque shock can be reduced to a predetermined value or less. In addition, through this method, since the current phase is not abruptly changed regardless of an electromotive load or a restoration load, the torque shock can be reduced to a predetermined value or less.

EMBODIMENT 11

Figure 12:
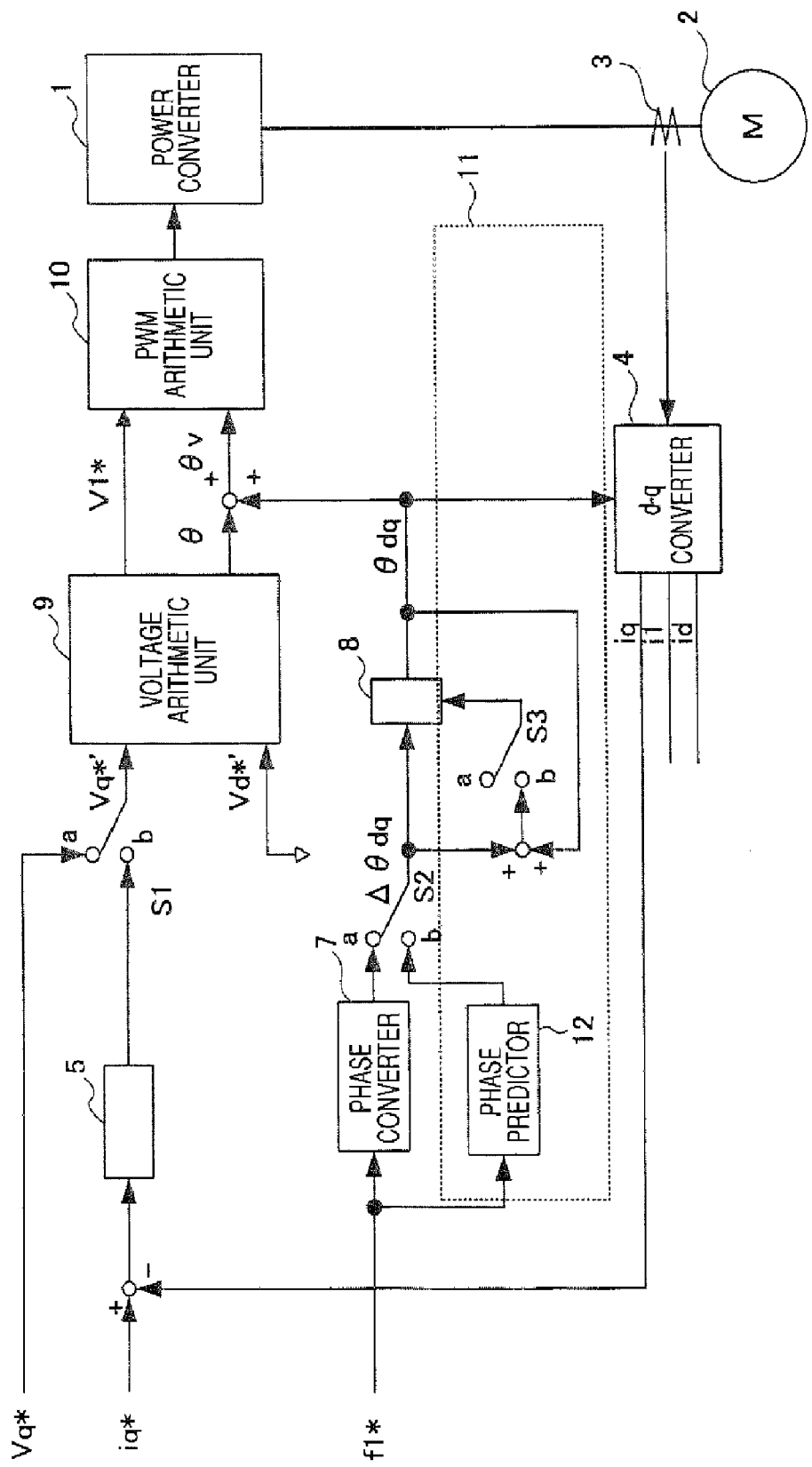
FIG. 12 is a block diagram illustrating a control device of an induction motor for applying a method according to the eleventh embodiment of the present invention.

FIG. 12 is a block diagram illustrating a control device of an induction motor for applying a method according to the eleventh embodiment of the present invention. The control device of an induction motor according to the present embodiment includes a power converter 1, an induction motor 2, a current detector 3, a d-q converter 4, a torque current controller 5, a phase converter 7, an integrator 8, a voltage arithmetic unit 9, a PWM arithmetic unit 10, a voltage phase prediction arithmetic unit 11, a phase predictor 12, and switches S1, S2, and S3. The power converter 1 converts a three phase AC current into a DC voltage having a predetermined frequency and voltage using a power element through a PWM control method and supplies it to the induction motor 2. The current detector 3 detects the current supplied to the induction motor 2. The d-q converter 4 separates the current detected by the current detector 3 into a torque current detection value iq and an excitation current detection value id. In addition, a primary current detection value i1 is output. The torque current controller 5 operates the q-axis voltage correction value Vqc such that the received excitation current instruction value id* corresponds with the torque current detection value iq. The phase converter 7 converts the received frequency f1* into a phase amount Δθdq between the samplings. The integrator 8 integrates the value Δθdq output from the phase converter 7 to operate the magnetic flux phase θdq. The voltage arithmetic unit 9 operates a primary voltage instruction V1* and a voltage phase θ, by setting a q-axis voltage instruction Vq*' to a q-axis voltage correction value Vqc or the q-axis voltage instruction Vq* given by the switch S1 and by setting a d-axis voltage instruction Vd*' to zero. The PWM arithmetic unit 10 determines a switching pattern of the power converter 1 based on the primary voltage instruction V1* and the output phase θv obtained by adding the voltage phase θ and the magnetic flux phase θdq. The voltage phase prediction arithmetic unit 11 predictably operates the voltage phase based on the output phase during a switch-over from the normal control state to the DC braking state and the value Δ∂dq output from the phase predictor. The phase detector 12 predictably calculates the velocity of the induction motor 2 for a switch-over from the normal control state to the DC braking state on the basis of a DC braking initiation frequency or a relationship between the DC braking initiation frequency and a deceleration rate, and converts it to a phase amount Δθdq between the samplings.

Specifically, a step of switching over from the normal control state to the DC braking state will be described with reference to FIG. 2. A step 1 is a step of determining a DC braking state and a normal control state. In this step, it is determined whether or not the received frequency f1* corresponds with the DC braking initiation frequency fdb during a deceleration. If the received frequency f1* is higher than the DC braking initiation frequency, a process advances to a step 2a as the normal control state. If the received frequency f1* corresponds with the DC braking initiation frequency, a process advances to a step 2b. In a step 2a, the switches S1 to S3 are operated in the side of "a" as the normal control state, and the FLG is set to zero (FLG=0), so that a process advances to a step of the PWM arithmetic unit which will be described below. In this case, a q-axis voltage instruction Vq* is set to the received q-axis voltage instruction Vq*, and the d-axis voltage instruction Vd* is set to zero (Vd*'=0), so that they are input to the voltage arithmetic unit 9. Accordingly, the phase amount Δθdq between the samplings is operated by the phase converter 7 based on the received frequency f1*, and the integrator 8 operates the magnetic flux phase θdq. In the step 2b, as a process of switching over from the normal control state to the DC braking state, the switches S1 and S2 are switched over from the side of "a" to the side of "b". Accordingly, the d-axis voltage instruction Vd*' is set to zero (vd*'=0), the q-axis voltage correction value Vqc operated such that the received current instruction iq* given for the DC control corresponds with the q-axis current detection value iq is output as the q-axis voltage instruction Vq*', and the phase amount A dq between the samplings is predictably calculated by the phase detector 12 on the basis of the DC braking initiation frequency or a relationship between the DC braking initiation frequency and the decelerating rate to obtain the velocity of the induction motor 2. Then, a process advances to a step 3, in which it is determined whether the FLG is "0" or "1". If the FLG is "0", a process advances to a step 4a. If the FLG is "1", a process advances to a step 4b. In the step 4a, the switch S3 is switched over from the side of "a" to the side of "b" in only one time at the instant that the switch-over to the DC braking state is performed, and a value obtained by adding the magnetic flux phase θdq of the normal control state and the phase amount Δθdq operated in the step 2a is substituted for the magnetic flux phase θdq, so as to match the phases between the normal control state and the DC braking initiation. In addition, the FLG is set to one (FLG=1) in order to perform this operation in only one time, and a process advances to a step of the PWM arithmetic unit. In the step 4b, since the switch S3 is maintained in the side of "a", any particular processing is not performed for the phase θdq.

In the step of the PWM arithmetic unit, the primary voltage instruction V1* and the voltage phase θ are operated from the d-axis voltage instruction Vd*' and the q-axis voltage instruction Vq*', and the output phase θv is operated from the voltage phase θ and the magnetic flux phase θdq, so that they are set in the PWM arithmetic unit 10 to drive the power converter 1.

Through the steps in the voltage phase prediction arithmetic unit 11, it is possible to accurately predict the magnetic flux phase of the induction motor 2 by predicting the velocity of the induction motor 2 using the phase predictor 12 when a switch-over from the normal control state to the DC braking state is performed. Therefore, the current phase is not abruptly changed when the DC braking is initiated, so that the torque shock can be reduced to a predetermined value or less. In addition, through this method, since the current phase is not abruptly changed regardless of an electromotive load or a restoration load, the torque shock can be reduced to a predetermined value or less.

EMBODIMENT 12

Figure 13:
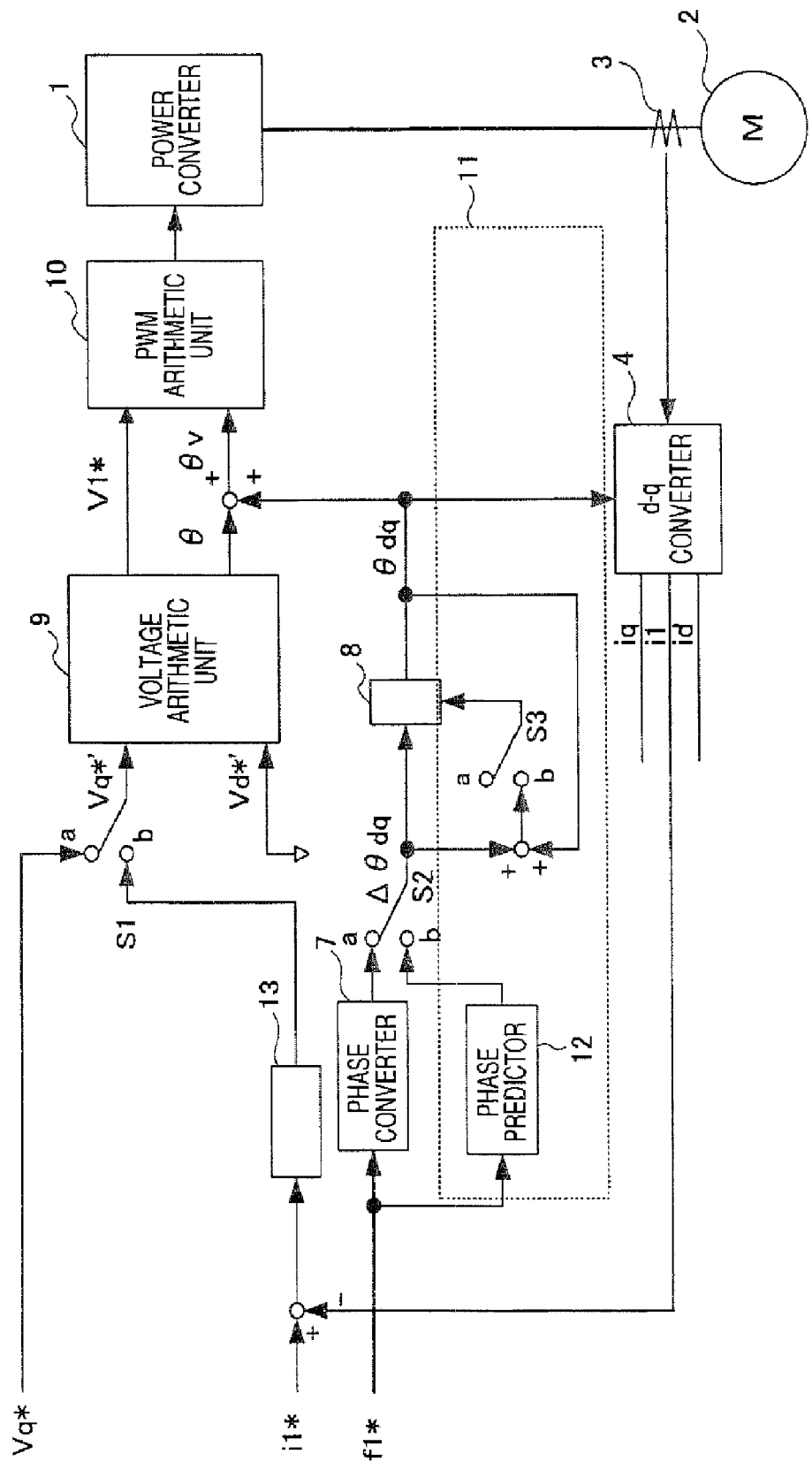
FIG. 13 is a block diagram illustrating a control device of an induction motor for applying a method according to the twelfth embodiment of the present invention.
Figure 14:
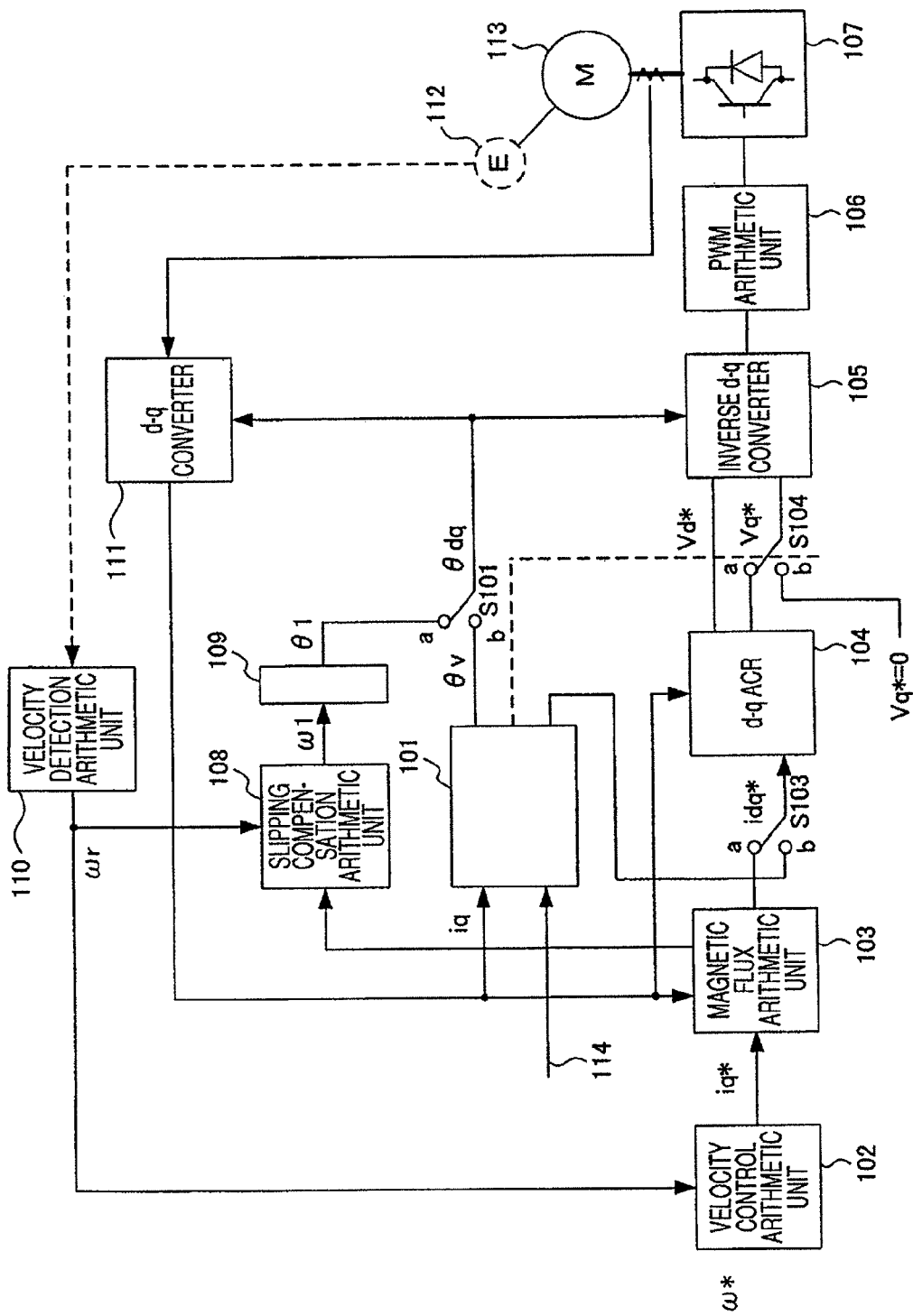
FIG. 14 is a block diagram illustrating a construction of an induction motor control device for applying a conventional method.
Figure 15:
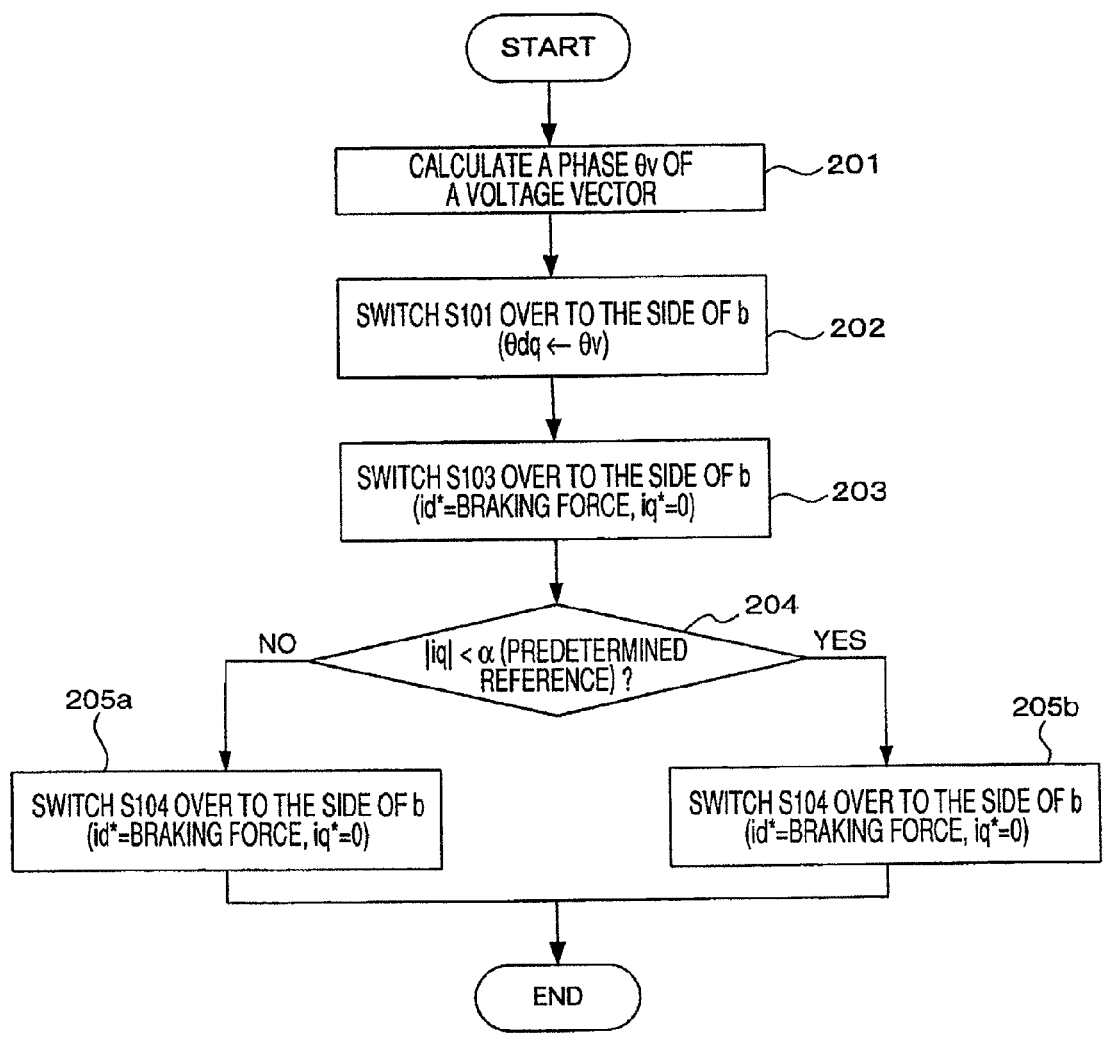
FIG. 15 is a flowchart illustrating a processing sequence of a conventional method.

FIG. 13 is a block diagram illustrating a control device of an induction motor for applying a method according to the twelfth embodiment of the present invention. The control device of an induction motor according to the present embodiment includes a power converter 1, an induction motor 2, a current detector 3, a d-q converter 4, a phase converter 7, an integrator 8, a voltage arithmetic unit 9, a PWM arithmetic unit 10, a voltage phase prediction arithmetic unit 11, a phase predictor 12, a primary current controller 13, and switches S1, S2, and S3. The power converter 1 converts a three phase AC current into a DC voltage having a predetermined frequency and voltage using a power element through a PWM control method and supplies it to the induction motor 2. The current detector 3 detects the current supplied to the AC motor 2. The d-q converter 4 separates the current detected by the current detector 3 into a torque current detection value iq and an excitation current detection value id. In addition, a primary current detection value i1 is output. The phase converter 7 converts the received frequency f1* into a phase amount Δθdq between the samplings. The integrator 8 integrates the value Δθdq output from the phase converter 7 to operate the magnetic flux phase θdq. The voltage arithmetic unit 9 operates a primary voltage instruction V1* and a voltage phase θ, by setting a q-axis voltage instruction Vq*' to the q-axis voltage instruction Vq* given by the switch S1 or the primary voltage correction value V1c and by setting a d-axis voltage instruction Vd*' to zero. The PWM arithmetic unit 10 determines a switching pattern of the power converter 1 based on the primary voltage instruction V1* and the output phase θv obtained by adding the voltage phase θ and the magnetic flux phase θdq. The voltage phase prediction arithmetic unit 11 predictably operates the voltage phase based on the output phase during a switch-over from the normal control state to the DC braking state and the value Δθdq output from the phase predictor. The phase detector 12 predictably calculates the velocity of the induction motor 2 for a switch-over from the normal control state to the DC braking state on the basis of a DC braking initiation frequency or a relationship between the DC braking initiation frequency and a deceleration rate, and converts it to a phase amount Δθdq between the samplings. The primary current controller 13 outputs the primary voltage correction value V1c such that the received primary current instruction i1* corresponds with the primary current detection value i1.

Specifically, a step of switching over from the normal control state to the DC braking state will be described with reference to FIG. 2. A step 1 is a step of determining a DC braking state and a normal control state. In this step, it is determined whether or not the received frequency f1* corresponds with the DC braking initiation frequency fdb during a deceleration. If the received frequency f1* is higher than the DC braking initiation frequency, a process advances to a step 2a as the normal control state. If the received frequency f1* corresponds with the DC braking initiation frequency, a process advances to a step 2b. In a step 2a, the switches S1 to S3 are operated in the side of "a" as the normal control state, and the FLG is set to zero (FLG=0), so that a process advances to a step of the PWM arithmetic unit which will be described below. In this case, the q-axis voltage instruction Vq*' is set to the received q-axis voltage instruction Vq*, and the d-axis voltage instruction Vd*' is set to zero (Vd*'=0), so that they are input to the voltage arithmetic unit 9. Accordingly, the phase amount Δθdq between the samplings is operated by the phase converter 7 based on the received frequency f1*, and the integrator 8 operates the magnetic flux phase θdq. In the step 2b, as a process of switching over from the normal control state to the DC braking state, the switches S1 and S2 are switched over from the side of "a" to the side of "b". Accordingly, the d-axis voltage instruction Vd*' is set to zero (Vd*'=0), the primary voltage correction value V1c operated such that the primary current instruction i1* given for a DC control corresponds with the primary current detection value i1 is output as the q-axis voltage instruction Vq*, and the phase amount Δθdq between the samplings is predictably calculated by the phase detector 12 on the basis of the DC braking initiation frequency or a relationship between the DC braking initiation frequency and the decelerating rate to obtain the velocity of the induction motor 2. Then, a process advances to a step 3, in which it is determined whether the FLG is "0" or "1". If the FLG is "0", a process advances to a step 4a. If the FLG is "1", a process advances to a step 4b. In the step 4a, the switch S3 is switched over from the side of "a" to the side of "b" in only one time at the instant that the switch-over to the DC braking state is performed, and a value obtained by adding the voltage phase θv of the normal control state and the phase amount Δθdq operated in the step 2a is substituted for the magnetic flux phase θdq, so as to match the phases between the normal control state and the DC braking initiation. In addition, the FLG is set to one (FLG=1) in order to perform this operation in only one time, and a process advances to a step of the PWM arithmetic unit. In the step 4b, since the switch S3 is maintained in the side of "a", any particular processing is not performed for the phase θdq.

In the step of the PWM arithmetic unit, the primary voltage instruction V1* and the voltage phase θ are operated from the d-axis voltage instruction Vd*' and the q-axis voltage instruction Vq*', and the output phase θv is operated from the voltage phase θ and the magnetic flux phase θdq, so that they are set in the PWM arithmetic unit 10 to drive the power converter 1.

Through the steps in the voltage phase prediction arithmetic unit 11, it is possible to accurately predict the magnetic flux phase of the induction motor 2 by predicting the velocity of the induction motor 2 using the phase predictor 12 when a switch-over from the normal control state to the DC braking state is performed. Therefore, the current phase is not abruptly changed when the DC braking is initiated, so that the torque shock can be reduced to a predetermined value or less. In addition, through this method, since the current phase is not abruptly changed regardless of an electromotive load or a restoration load, the torque shock can be reduced to a predetermined value or less.

The present invention may be employed not only in an induction motor control device that uses, so called, a sensor less vector control method but also in a vector control device having a sensor or a control device that uses a V/f control method.

INDUSTRIAL APPLICABILITY

According to the present invention, it is possible to reduce the torque shock generated by an abrupt change of the output current phase to a predetermined value or less by predictably operating an output voltage phase during a DC braking on the basis of an output voltage phase of a normal control state when a switch-over from the normal control state to the DC braking state is performed. Therefore, the present invention may be employed in a usage for preventing an induction motor from being not rotated until the brake is closed, such as an application for determining a position or an elevating machinery (for example, an elevator, a crane, and a hoist).

The invention claimed is:

1. A direct current (DC) braking method for stopping an induction motor,
the method using a control device including: a power converter for driving the induction motor, a PWM arithmetic unit for determining a switching pattern of the power converter on the basis of a primary voltage instruction and an output phase obtained by adding a voltage phase and a magnetic flux phase, a voltage arithmetic unit, a torque current controller and an excitation current controller, wherein
torque shock generated by an abrupt change of an output current phase is reduced to a predetermined value or less by predictably operating an output voltage phase during the DC braking on the basis of an output voltage phase of a normal control state, when a switch-over from the normal control state to a DC braking state is performed.

2. The DC braking method according to claim 1, wherein the output voltage phase during the DC braking is predictably operated on the basis of an output voltage phase of the normal control state and a phase advanced until the DC braking is initiated.

3. The DC braking method according to claim 2, wherein the phase advanced until the DC braking is initiated is operated on the basis of a setup DC braking initiation frequency.

4. The DC braking method according to claim 2, wherein the phase advanced until the DC braking is initiated is operated on the basis of a deceleration rate and a setup DC braking initiation frequency.

5. The DC braking method according to claim 1 wherein the torque shock during a restart is reduced to a predetermined value or less by controlling the output voltage phase during the DC braking with respect to a coordinate axis for a normal control.

6. A control device capable of a DC braking for stopping an induction motor,
the control device comprising:
a power converter for driving the induction motor;
a PWM arithmetic unit for determining a switching pattern of the power converter on the basis of a primary voltage instruction and an output phase obtained by adding a voltage phase and a magnetic flux phase;
a voltage arithmetic unit;
a torque current controller; and an excitation voltage controller, wherein torque shock generated by an abrupt change of an output current phase is reduced to a predetermined value or less by predictably operating an output voltage phase during the DC braking on the basis of an output voltage phase of a normal control state, when a switch-over from the normal control state to a DC braking state is performed.

7. The control device according to claim 6, wherein the output voltage phase during the DC braking is predictably operated on the basis of an output voltage phase of the normal control state and a phase advanced until the DC braking is initiated.

8. The control device according to claim 7, wherein the phase advanced until the DC braking is initiated is operated on the basis of a setup DC braking initiation frequency.

9. The control device according to claim 7, wherein the phase advanced until the DC braking is initiated is operated on the basis of a deceleration rate and a setup DC braking initiation frequency.

10. The control device according to claim 6, wherein the torque shock during a restart is reduced to a predetermined value or less by controlling the output voltage phase during the DC braking with respect to a coordinate axis for a normal control.

11. The DC braking method according to claim 2, wherein the torque shock during a restart is reduced to a predetermined value or less by controlling the output voltage phase during the DC braking with respect to a coordinate axis for a normal control.

12. The DC braking method according to claim 3, wherein the torque shock during a restart is reduced to a predetermined value or less by controlling the output voltage phase during the DC braking with respect to a coordinate axis for a normal control.

13. The DC braking method according to claim 4, wherein the torque shock during a restart is reduced to a predetermined value or less by controlling the output voltage phase during the DC braking with respect to a coordinate axis for a normal control.

14. The control device according to claim 7, wherein the torque shock during a restart is reduced to a predetermined value or less by controlling the output voltage phase during the DC braking with respect to a coordinate axis for a normal control.

15. The control device according to claim 8, wherein the torque shock during a restart is reduced to a predetermined value or less by controlling the output voltage phase during the DC braking with respect to a coordinate axis for a normal control.

16. The control device according to claim 9, wherein the torque shock during a restart is reduced to a predetermined value or less by controlling the output voltage phase during the DC braking with respect to a coordinate axis for a normal control.

* * * * *